United States Patent
Azimi et al.

(10) Patent No.: US 12,061,883 B2
(45) Date of Patent: Aug. 13, 2024

(54) SYSTEM AND METHOD FOR AUTOMATIC MODIFICATION OF A USER INTERFACE

(71) Applicant: MYPLANET INTERNET SOLUTIONS LTD., Toronto (CA)

(72) Inventors: Ebrahim Azimi, Mississauga (CA); Scott Harrington, Toronto (CA); Jason Cottrell, Toronto (CA)

(73) Assignee: MYPLANET INTERNET SOLUTIONS LTD, Toronto (CA)

( * ) Notice: Subject to any disclaimer, the term of this patent is extended or adjusted under 35 U.S.C. 154(b) by 0 days.

(21) Appl. No.: 17/893,375

(22) Filed: Aug. 23, 2022

(65) Prior Publication Data

US 2023/0131183 A1 Apr. 27, 2023

Related U.S. Application Data

(60) Provisional application No. 63/271,908, filed on Oct. 26, 2021.

(51) Int. Cl.
| | | |
|---|---|---|
| *G06F 3/048* | (2013.01) | |
| *G06F 8/38* | (2018.01) | |
| *G06F 8/41* | (2018.01) | |
| *G06F 9/451* | (2018.01) | |
| *G06F 11/36* | (2006.01) | |

(52) U.S. Cl.
CPC .............. *G06F 8/38* (2013.01); *G06F 3/048* (2013.01); *G06F 8/433* (2013.01); *G06F 9/451* (2018.02); *G06F 11/3684* (2013.01)

(58) Field of Classification Search
None
See application file for complete search history.

(56) References Cited

U.S. PATENT DOCUMENTS

| | | | | |
|---|---|---|---|---|
| 10,871,977 | B2* | 12/2020 | Hanke | G06F 11/3688 |
| 11,138,518 | B1* | 10/2021 | Yu | G06F 9/44526 |
| 2015/0294253 | A1* | 10/2015 | Bhat | G06Q 10/06316 |
| | | | | 705/7.26 |
| 2016/0292217 | A1* | 10/2016 | Sinha | H04M 1/72454 |
| 2020/0134388 | A1* | 4/2020 | Rohde | G06N 5/022 |
| 2020/0320455 | A1* | 10/2020 | Chin | G06F 3/0482 |
| 2021/0209670 | A1* | 7/2021 | Kupritz | G06Q 30/0633 |
| 2021/0232374 | A1 | 7/2021 | Weibel | |
| 2021/0232755 | A1 | 7/2021 | Jadhav et al. | |
| 2021/0248490 | A1 | 8/2021 | Ma et al. | |

FOREIGN PATENT DOCUMENTS

| | | |
|---|---|---|
| CN | 112199290 A | 1/2021 |
| WO | 2021127778 A1 | 7/2021 |

\* cited by examiner

*Primary Examiner* — Xuyang Xia
(74) *Attorney, Agent, or Firm* — Tarolli, Sundheim, Covell & Tummino LLP

(57) ABSTRACT

A system and method of user interface modification, and more particularly a system and method of automatically modifying a user interface to improve the quantitative evaluation of the user interface.

20 Claims, 25 Drawing Sheets

Input example - Product page

| Green ▼ ≡ |
| Large ▼ ≡ |
| Buy |

Lorem ipsum dolor sit amet, consectetur adipiscing elit. Vivamus ut imperdiet turpis, et laoreet justo. Mauris interdum tellus in eros vestibulum, fringilla laoreet felis blandit. Nulla faucibus vehicula ipsum, ut rutrum augue pellentesque eget. Cras pharetra pretium tincidunt. Nam nec mauris nec orci aliquet placerat at vitae turpis. Vivamus tincidunt fermentum urna sed iaculis. Suspendisse vitae tellus lobortis.

Image of Product

User 1
Lorem ipsum dolor sit amet, consectetur adipiscing elit. Vivamus ut imperdiet turpis, et laoreet justo. Mauris interdum tellus in eros vestibulum, fringilla laoreet felis blandit. Nulla faucibus vehicula ipsum, ut rutrum augue pellentesque eget. Cras pharetra pretium tincidunt. Nam nec mauris nec orci aliquet placerat at vitae turpis. Vivamus tincidunt fermentum urna sed iaculis. Suspendisse vitae tellus lobortis, pulviner velit ac. molestie justo.
User 2
Lorem ipsum dolor sit amet, consectetur adipiscing elit. Vivamus ut imperdiet turpis, et laoreet justo. Mauris interdum tellus in eros vestibulum, fringilla laoreet felis blandit. Nulla faucibus vehicula ipsum, ut rutrum augue pellentesque eget. Cras pharetra pretium tincidunt. Nam nec mauris nec Lorem ipsum dolor sit amet, consectetur adipiscing elit. Vivamus ut imperdiet turpis, et laoreet justo. Mauris interdum tellus in eros vestibulum, fringilla laoreet felis blandit. Nulla faucibus vehicula ipsum, ut rutrum augue pellentesque eget. Cras pharetra pretium tincidunt. Nam nec mauris nec orci aliquet placerat at vitae turpis. Vivamus tincidunt fermentum urna sed iaculis. Suspendisse vitae tellus lobortis, pulviner velit ac. molestie justo.
Lorem ipsum dolor sit amet, consectetur adipiscing elit. Vivamus ut imperdiet turpis, et laoreet justo. Mauris interdum tellus in eros vestibulum, fringilla laoreet felis blandit. Nulla faucibus vehicula ipsum, ut rutrum augue pellentesque eget. Cras pharetra pretium tincidunt. Nam nec mauris nec orci aliquet placerat at vitae turpis. Vivamus tincidunt fermentum urna sed iaculis. Suspendisse vitae tellus lobortis, pulviner velit ac. molestie justo.

FIG. 5A-A

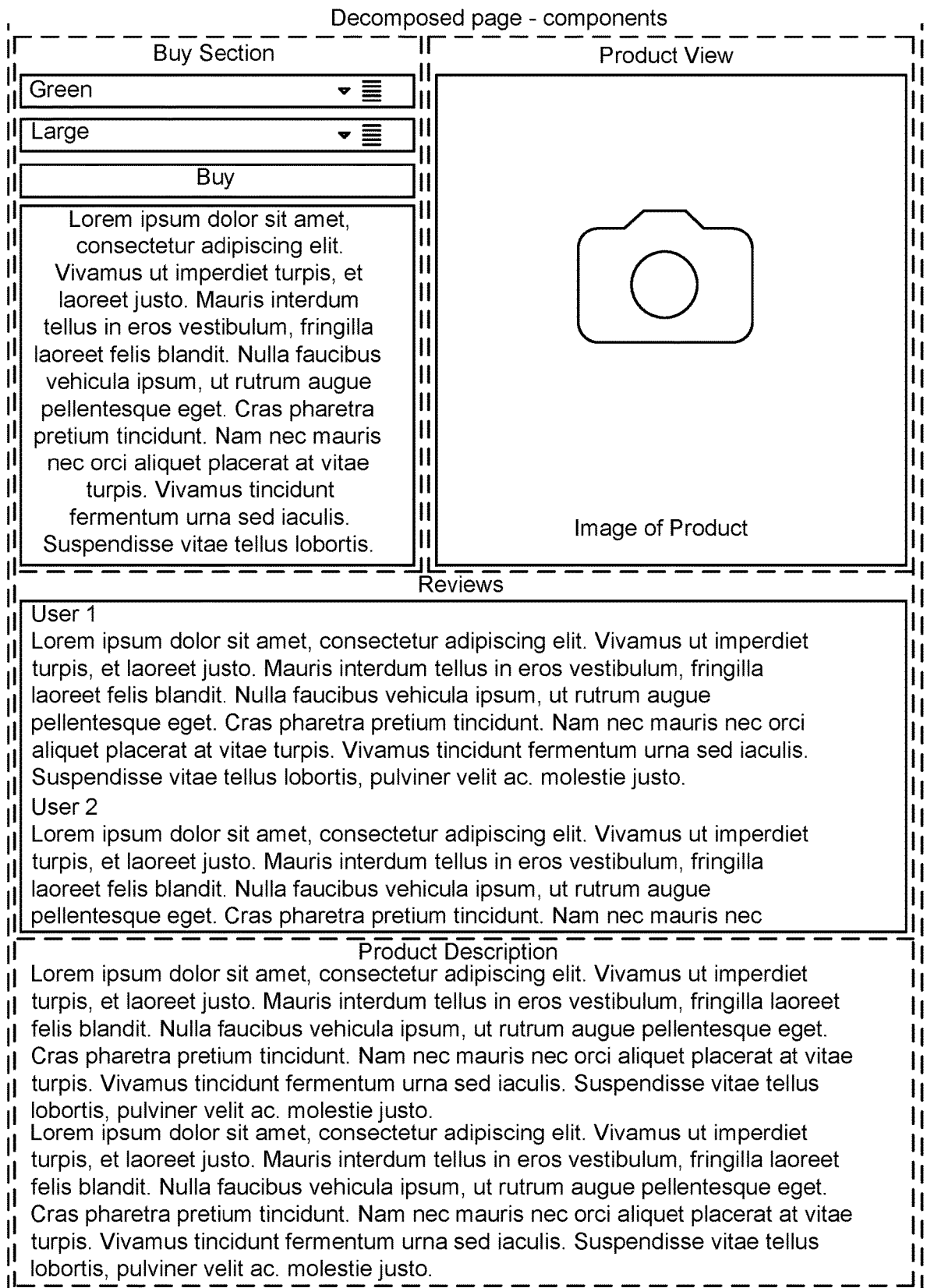
FIG. 5A-B

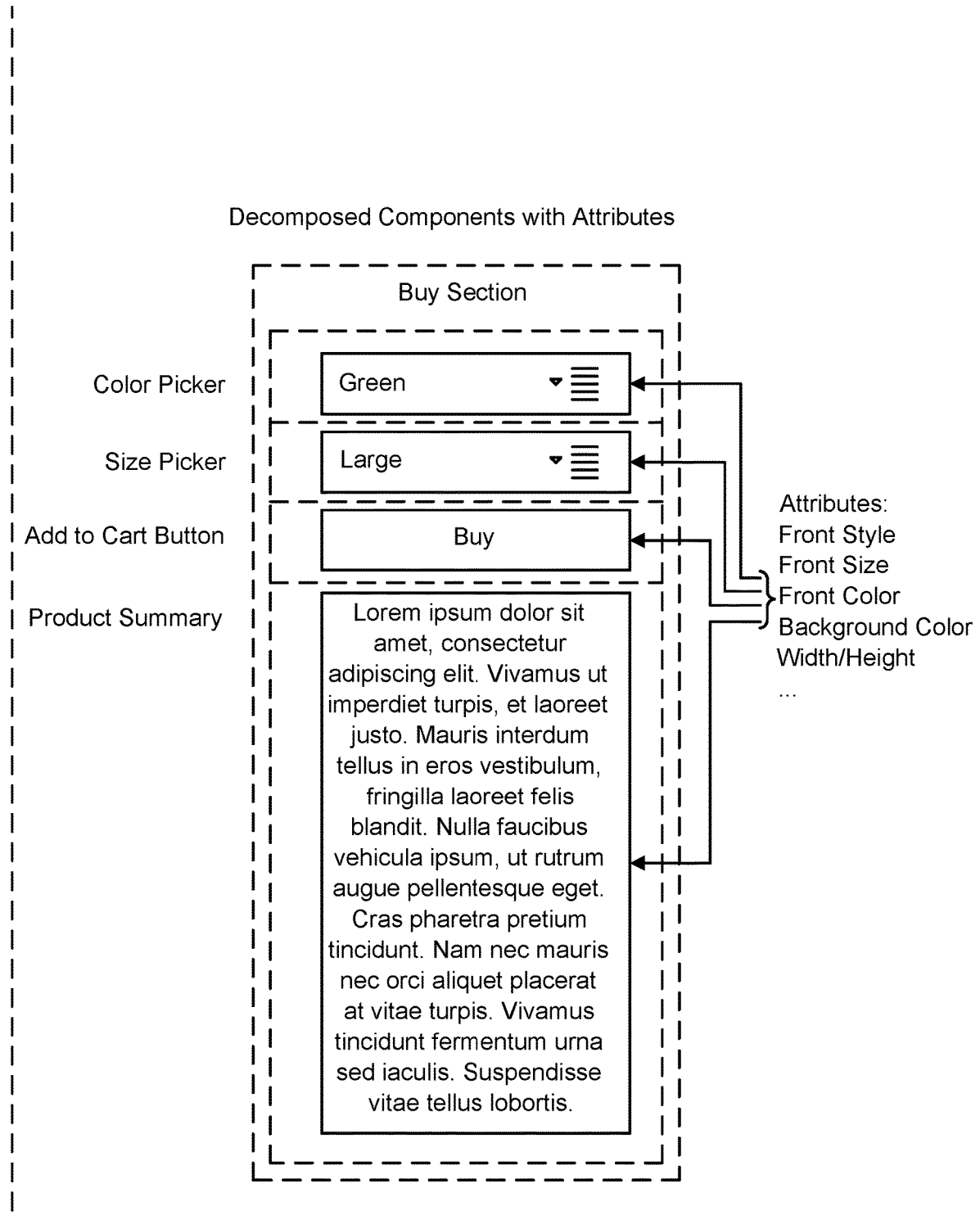
FIG. 5A-C

| Evaluation of guidelines and performance prediction | Performance Improcement | Rank |
|---|---|---|
| Issue_1: Add shipping Info In buy section | 0.22% | 1 |
| Issue_2: Style product description (bullet point + paragraph) | 0.11% | 2 |
| Issue3: Use thumbnail in image gallery | 0.09% | 3 |
| Issue_4: Make the image Overlay >80% of page width | 0.06% | 4 |

FIG. 7A

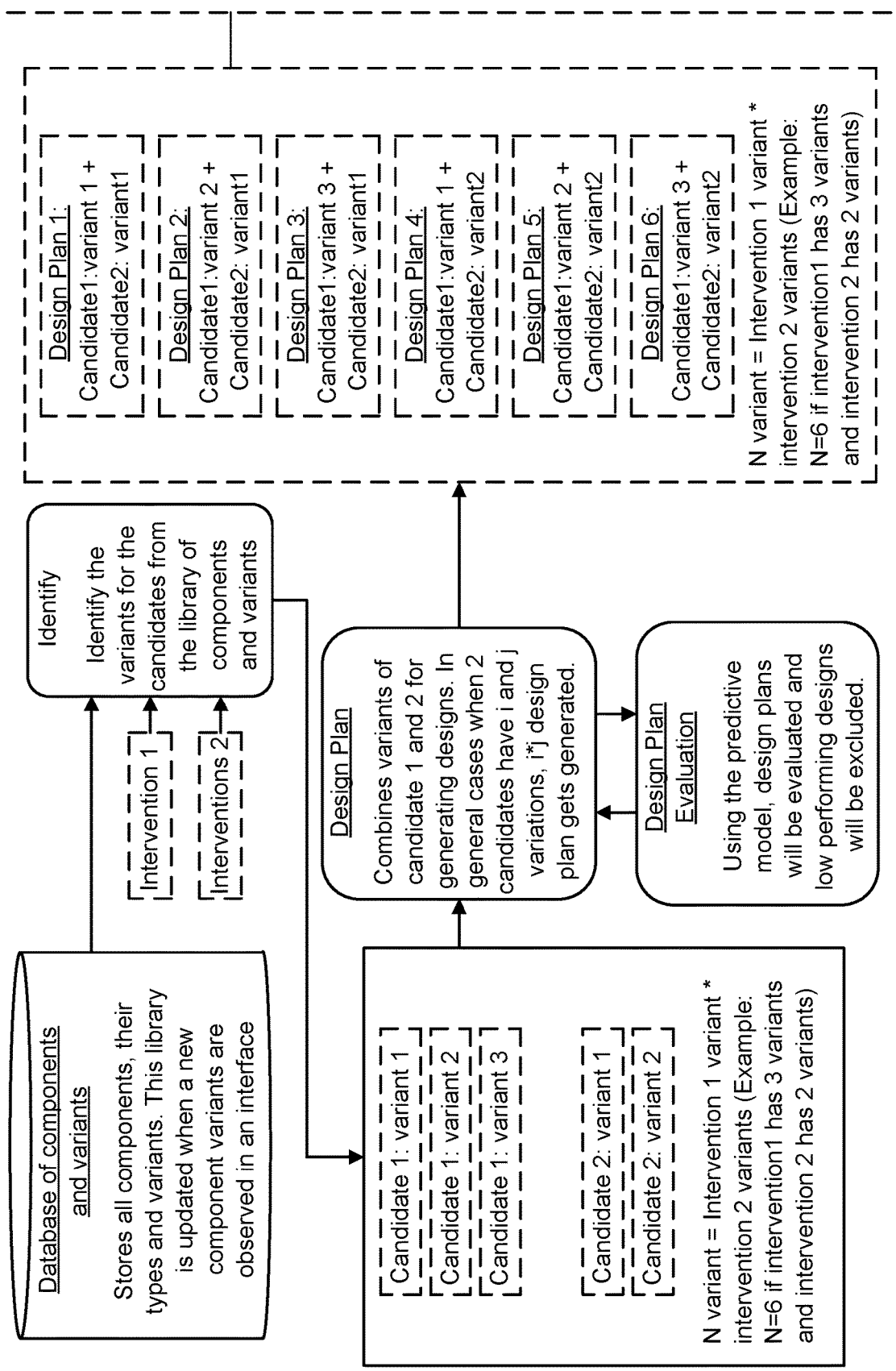
FIG. 12B-A

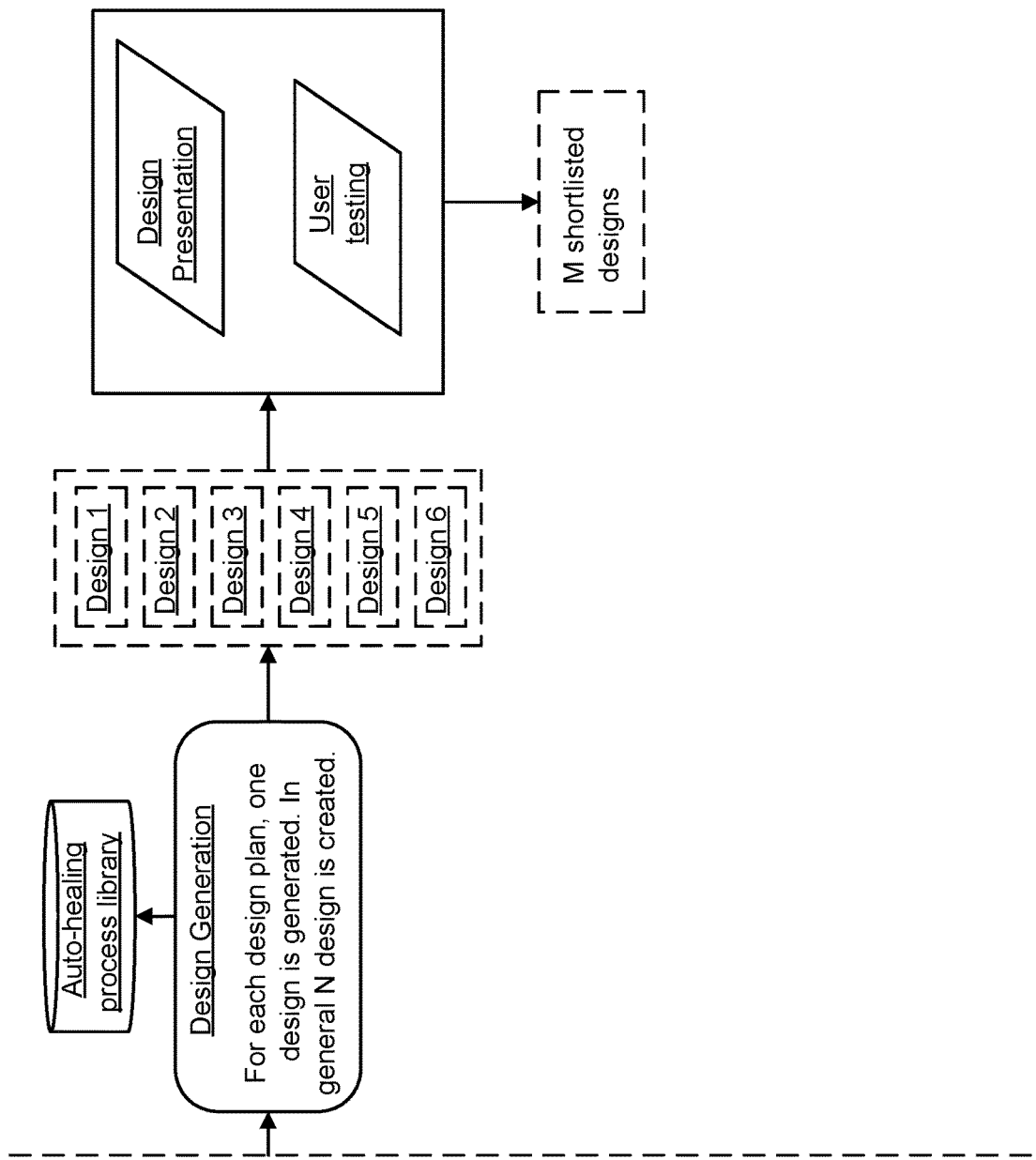
FIG. 12B-B

```
┌─────────────────────────────────────────────────┐
│                    Initial                      │
│        Free shipping promotion in the Header    │
│        Free shipping with minum purchase of $X  │
└─────────────────────────────────────────────────┘
```

| Green ▼ |
| Large ▼ |
| Buy |

Lorem ipsum dolor sit amet, consectetur adipiscing elit. Vivamus ut imperdiet turpis, et laoreet justo. Mauris interdum tellus in eros vestibulum, fringilla laoreet felis blandit. Nulla faucibus vehicula ipsum, ut rutrum augue pellentesque eget. Cras pharetra pretium tincidunt. Nam nec mauris nec orci aliquet placerat at vitae turpis. Vivamus tincidunt fermentum urna sed iaculis. Suspendisse vitae tellus lobortis.

Image of Product

Product Description

Lorem ipsum dolor sit amet, consectetur adipiscing elit. Vivamus ut imperdiet turpis, et laoreet justo. Mauris interdum tellus in eros vestibulum, fringilla laoreet felis blandit. Nulla faucibus vehicula ipsum, ut rutrum augue pellentesque eget. Cras pharetra pretium tincidunt. Nam nec mauris nec orci aliquet placerat at vitae turpis. Vivamus tincidunt fermentum urna sed iaculis. Suspendisse vitae tellus lobortis, pulviner velit ac. molestie justo.

Lorem ipsum dolor sit amet, consectetur adipiscing elit. Vivamus ut imperdiet turpis, et laoreet justo. Mauris interdum tellus in eros vestibulum, fringilla laoreet felis blandit. Nulla faucibus vehicula ipsum, ut rutrum augue pellentesque eget. Cras pharetra pretium tincidunt. Nam nec mauris nec orci aliquet placerat at vitae turpis. Vivamus tincidunt fermentum urna sed iaculis. Suspendisse vitae tellus lobortis, pulviner velit ac. molestie justo.

FIG. 12D-A

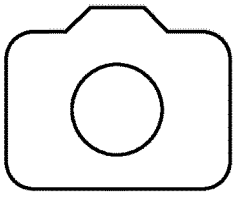
FIG. 12D-B

SYSTEM AND METHOD FOR AUTOMATIC MODIFICATION OF A USER INTERFACE

RELATED APPLICATION

This application claims the benefit of U.S. Provisional Patent Application Ser. No. 63/271,908, filed on Oct. 26, 2021, the disclosure of which is entirely incorporated herein by reference.

FIELD OF THE INVENTION

The present specification relates generally to a system and method of user interface modification, and more particularly to a system and method of automatically modifying a user interface to improve the quantitative evaluation of the user interface.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

User interfaces (UIs) are ubiquitous in modern technology, whether through websites and webpages, on personal devices (phones, tablets, wearables) and on appliances (fridges, stoves) and transportation (automobiles). The capability of a UI to deliver a combination of functionality and user experience is therefore an ongoing multi-industry challenge.

A known challenge is the effective evaluation of an existing or proposed UI to determine the eventual user experience. From there, another challenge is determining how modifications to the UI will impact the user experience, positively or negatively.

Generally, modification of a UI requires manual implementation of changes followed by testing to attempt to assess if the changes represent an improvement. In many cases, changes are required to be deployed in a live environment, creating the risk of unforeseen negative impacts.

Accordingly, there remains a need for improvements in the art to address the noted challenges.

SUMMARY OF THE INVENTION

According to an embodiment of the invention, there is provided a method for automatic modification of a graphical user interface (GUI), comprising: decomposing the UI into discrete components, by applying a component classification engine to the UI, the classification engine applying a combination of decomposition methods, the decomposition methods comprising one or more of: Optical Character Recognition (OCR), image analysis, and source code analysis, identifying one or more attributes for each discrete component; evaluating each discrete component of the UI by applying an evaluation engine to produce a quantitative evaluation of UI impact for each discrete component based on a comparison with historical UI data from a historical UI database; generating one or more potential modifications to one or more discrete components from a database of potential modifications; scoring the UI impact according to the predicted change in UI impact of the one or more potential modifications based on the historical UI data to generate a quantitative value for each potential modification based on the predicted outcome of the potential modification; prioritizing potential modifications based on the quantitative value for the best predicted outcome; and modifying the UI based on at least one of the prioritized potential modifications.

The embodiment may further comprise the steps of: selecting one or more of the prioritized potential modifications for testing; generating one or more potential modified UIs for testing from the selected prioritized potential modifications; and applying multivariate testing to the potential modified UIs to identify a final modified UI design.

The scoring may further comprise analysis of dependencies between the discrete component and other discrete components. The best predicted outcome may further comprise a combination of maximizing positive quantitative impact, maximizing confidence of impact, and minimizing dependencies.

The potential modifications may be selected from one of more of: adding a component, deleting a component, moving a component and modifying an attribute of a component. The potential modifications may be selected from a database of components and modified components.

The evaluation and scoring may further comprise prediction of user intent of sequential steps of user interactions with the UI based on database of historic user interactions with the UI and other equivalent UIs.

The potential modified UIs may comprise multiple potential modifications in a single potential modified UI.

In another embodiment, the method may further comprise presenting the prioritized potential modifications and associated quantitative value impacts to a user for selection. The user selection inputs may then be added to the historical UI data in the historical UI database, and/or the database of potential modifications.

According to another embodiment of the invention, there is provided a system for automatic modification of a graphical user interface (GUI), comprising: a component classification engine operative to decompose the UI into discrete components, the classification engine applying a combination of decomposition methods, the decomposition methods comprising one or more of: Optical Character Recognition (OCR), image analysis, and source code analysis, the component classification engine operative to identify one or more attributes for each discrete component; an evaluation engine operative to evaluate each discrete component of the UI to produce a quantitative evaluation of UI impact for each discrete component based on a comparison with historical UI data from a historical UI database; the evaluation engine operation to generate one or more potential modifications to one or more discrete components from a database of potential modifications; a UI scoring component operative to score the UI impact according to the predicted change in UI impact of the one or more potential modifications based on the historical UI data to generate a quantitative value for each potential modification based on the predicted outcome of the potential modification; an planning component operative to prioritize potential modifications based on the quantitative value for the best predicted outcome; and the implementation component operative to modify the UI based on at least one of the prioritized potential modifications.

In another embodiment, the system may further comprise a presentation component operative to present the prioritized potential modifications and their associated quantitative value impacts to a user for selection. The system may add the user selection inputs to the historical UI data in the historical UI database, and/or the database of potential modifications.

The implementation component may be further operative to: select one or more of the prioritized potential modifications for testing; generate one or more potential modified UIs for testing from the selected prioritized potential modifications; and apply multivariate testing to the potential modified UIs to identify a final modified UI design.

The UI scoring component may be further operative to analyze dependencies between the discrete component and other discrete components. The planning component may be further operative to generate the best predicted outcome based on a combination of maximizing positive quantitative impact, maximizing confidence of impact and minimizing dependencies.

wherein the evaluation engine is further operative to select potential modifications from one of more of: adding a component, deleting a component, moving a component and modifying an attribute of a component.

The UI scoring component may be further operative to apply prediction of user intent of sequential steps of user interactions with the UI based on database of historic user interactions with the UI and other equivalent UIs.

The potential modified UIs may comprise multiple potential modifications in a single potential modified UI. The potential modifications may be selected from a database of components and modified components.

According to a further embodiment of the invention, there is provided a system and method for automatic modification of a user interface (UI), comprising: a) decomposing the UI into discrete components via application of a combination of decomposition methods, the decomposition methods comprising one or more of: Optical Character Recognition (OCR), Image detection and classification, natural language processing, and source code analysis, with each discrete component further assigned one or more attributes; b) analyzing the discrete components of the UI via a predictive performance engine to produce an evaluation, the evaluation generating a list of performance parameters per segment (based on user, product, and brand) associated with one or more of the discrete components; c) generating a quantitative evaluation value impact based on the performance parameters for each discrete component, identifying which discrete components generate a value impact and ranking the identified components based on the magnitude of the value impact; d) selecting one or more modifications (add/replace/delete) to the identified components via iterative application of the predictive performance engine to one or more potential modifications to the attributes of the identified components via modification of one or more attributes of the identified components such that the selected modification produces an improvement to the quantitative evaluation value impact for the identified component; and e) generating a modified UI, the modified UI containing one or more of the modified components.

According to a further embodiment, the analysis and evaluation may further include prediction of user intent of sequential steps of user interactions with the UI based on database of historic user interactions with the UI and other equivalent UIs using a machine learning algorithm. Additionally, the evaluation of modified UI may be performed using a combination of quantitative and qualitative analysis. The evaluation may further comprise an assessment of dependencies between the discrete components.

The performance parameters may comprise one or more of: layout, content, showing/hiding components and display resolution. Additionally, the attributes may comprise one or more of: font color, font size, image size, image resolution, display position, and interactivity.

According to a further embodiment, the generation of the modified UI may further include applying code changes for the modified components into the UI code.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which:

FIG. 1B is a detail-level system diagram according to FIG. 1a;

FIGS. 5A-A, 5A-B, and 5A-C are an example of the classification process of FIG. 4;

FIG. 5B is a flowchart of the image analysis process from FIGS. 5A-A to 5A-C;

FIG. 7A is an example of the evaluation and scoring process;

FIGS. 12A, 12B-A, 12B-B and 12C are flowcharts of embodiments of the auto-healing process;

FIGS. 12D-A and 12D-B are an illustrated sample of an image mockup from a heal operation.

Like reference numerals indicated like or corresponding elements in the drawings.

DETAILED DESCRIPTION OF THE EMBODIMENTS

The present invention relates generally to a system and method of user interface modification, and more particularly to a system and method of automatically modifying a user interface to improve the quantitative evaluation of the user interface.

An auto-assessment system as according to an embodiment uses a combination of an image of the UI and the code representation for the UI as the input. An assessment is made of the page and its components, and a UI report is generated. The report looks at layout and component types and attributes and scores them based on a combination of UI best practices and guidelines as well as observed user behavior and comparative testing (e.g. A/B testing) as discussed further below. These assessments may be performed in a range of different environments which may include: assessments against live websites or apps, and assessments against UI mockups and prototypes created in a design tool.

Figure 1A:
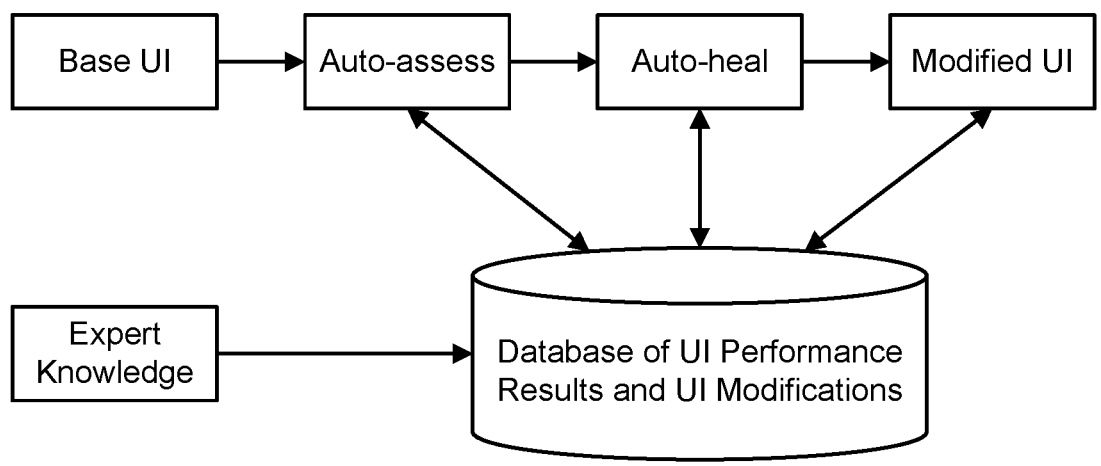
FIG. 1A is a high-level system diagram of the UI auto-assessment system according to an embodiment.
Figure 1B:
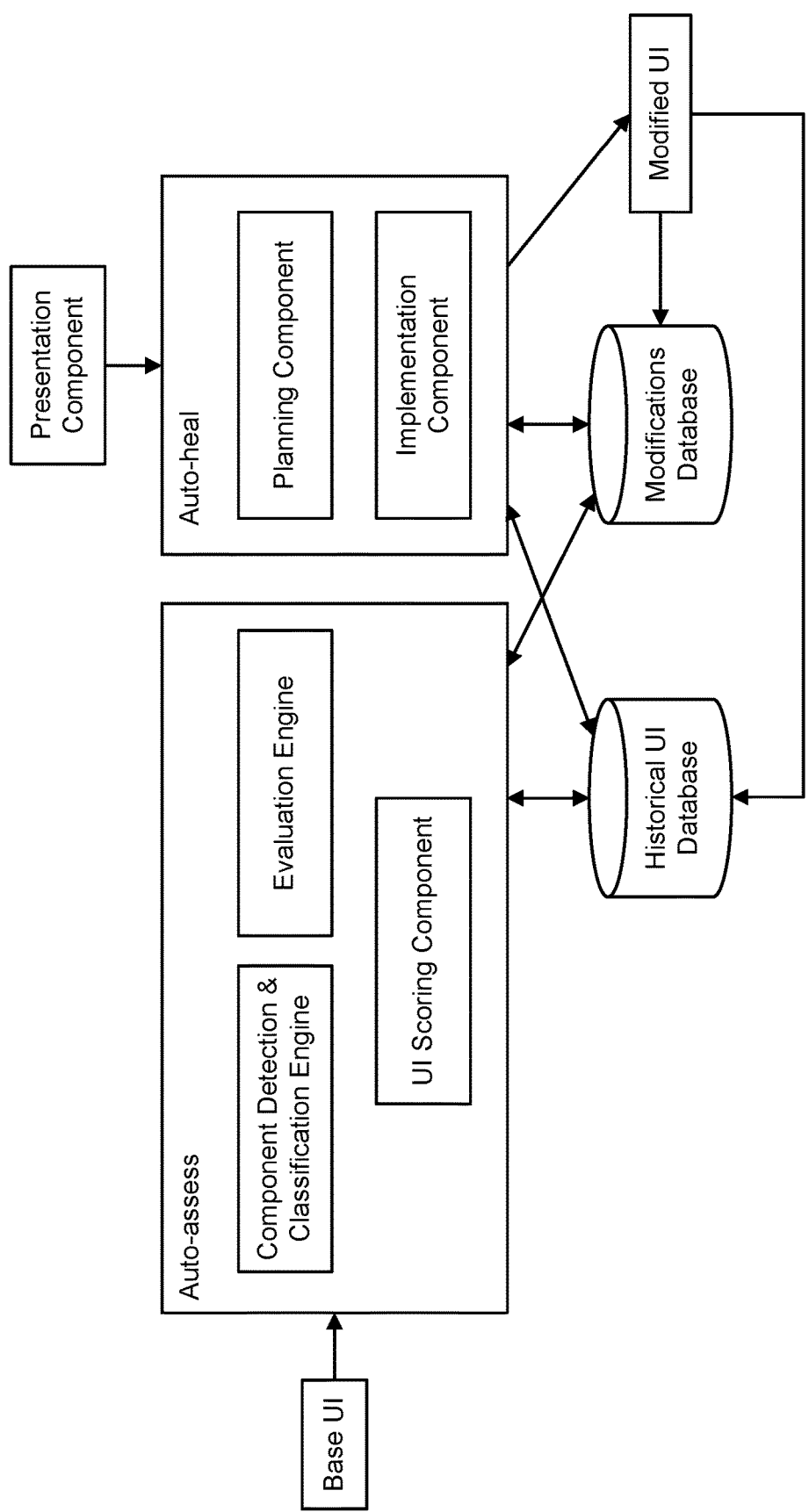

As shown in the embodiment of FIGS. 1A and 1B, the system takes a base UI through an auto-assess system and auto-heal system to generate a modified UI. Each system exchanges information with a database of UI performance results and UI modifications which may be supported by expert knowledge. More specifically, the auto-assess system is comprised of a component detection and classification engine, an evaluation engine and a UI scoring component. The auto-heal system is comprised of a planning component and an implementation component. The system may further include a presentation component to display scores for proposed UI modifications, and the proposed UI modifications.

Figure 2:
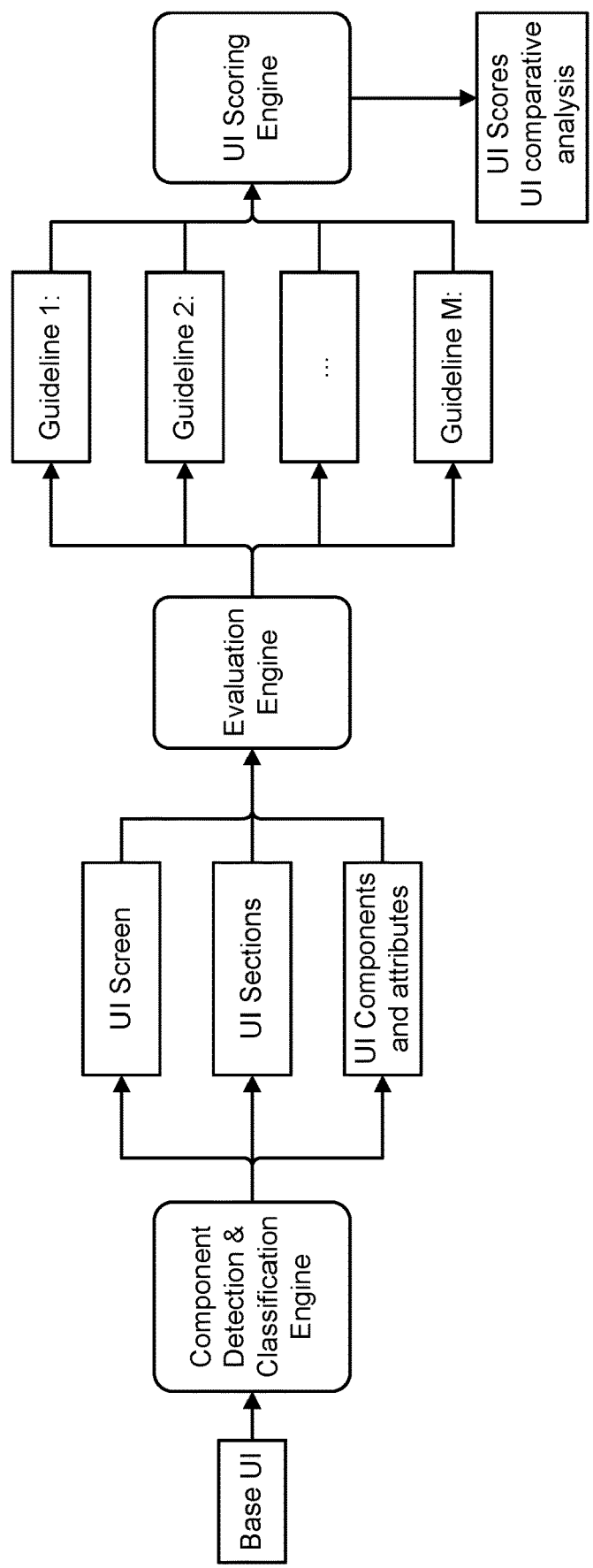
FIG. 2 is a flowchart of the UI auto-assessment system according to an embodiment.

As shown in the embodiment of FIG. 2, the UI auto-assessment system is comprised of a component detection and classification engine 110 which receives the base (original) UI as an input and separates the UI into separate elements (screen, sections, components and attributes). An evaluation engine 120 evaluates the elements and produces a number of guidelines for modifications to the UI. A scoring engine 130 generates a score for each modification and a comparative analysis of the proposed modifications. In an embodiment, decomposition may comprise component detection and classification. In another embodiment, the decomposition methods comprising one or more of: Optical Character Recognition (OCR), image analysis, and source code analysis. In another embodiment, the decomposition methods comprise OCR, image analysis, and source code analysis.

Figure 3A:
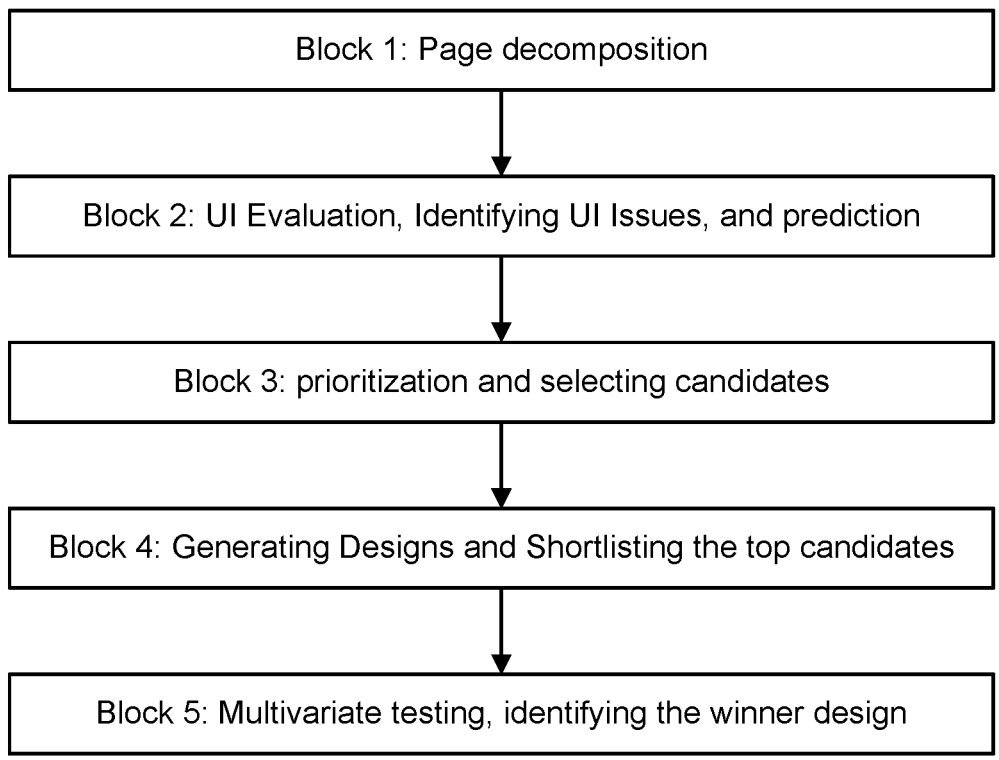
FIG. 3A is a block diagram of the automatic modification process.
Figure 3B:
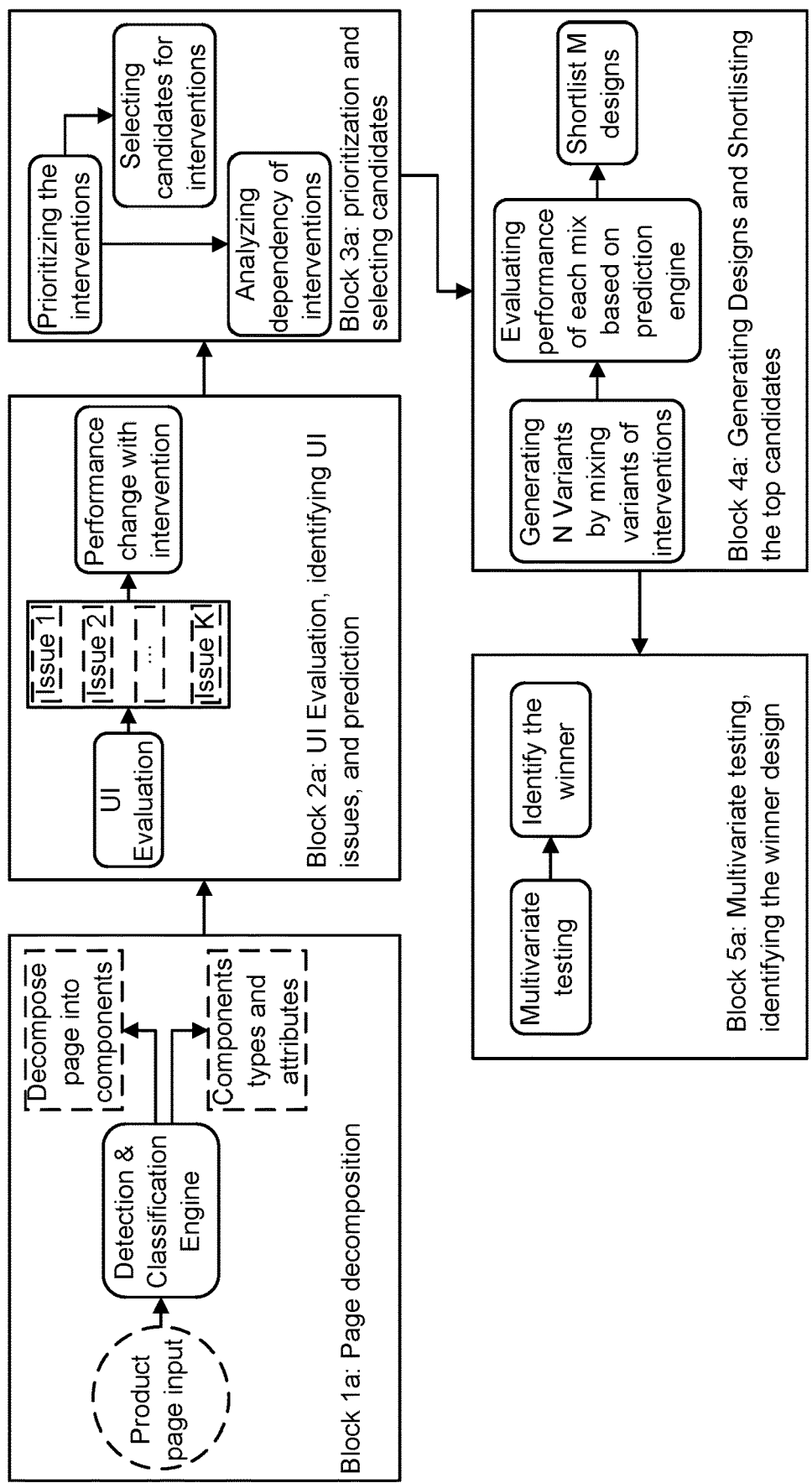
FIG. 3B is a flowchart of the automatic modification process of FIG. 3A.

According to an embodiment as shown in the block diagram and flowchart of FIGS. 3A and 3B, a method of modifying a user interface (UI), such as a website page, is performed by decomposing the UI into separate UI components via the detections and classification engine, with each UI component further comprising a set of types and attributes that may be modified. The UI is then evaluated using a set of guidelines to identify UI issues for potential modification. The modifications (interventions) are then assessed for their predicted impact on the UI and assigned a score.

Based on the score, potential modifications are prioritized and selected for testing. At this stage, the dependency of modifications on other components of the UI may be considered to avoid unexpected cascading effects. Selected candidates are generated as designs in one or more variants and assessed for performance impact according to the prediction engine. From this process, a shortlist of top candidate modifications is generated.

In an embodiment, this shortlist is then subject to multivariate testing to determine the preferred and recommended ("winning") modification design which may then be applied to the UI.

The detection and classification engine combines Visual AI and programmatic analysis to detect and classify the interface components and layout. The Visual AI approach uses several AI tools to decompose the interface into its components. These tools may include a vision tool to apply a deep learning approach to detect and classify objects in the interface image; an Optical Character Recognition (OCR) tool to detect text from the image; and a Natural Language Processing (NLP) tool to process the text.

The assessment is performed on a specific UI screen or a sequence of UI screens, which may include a video representation of the UI. Using an ecommerce application as an example, a subset of the screens may include: a home page, a product listing page, a product page and a checkout page.

Figure 4:
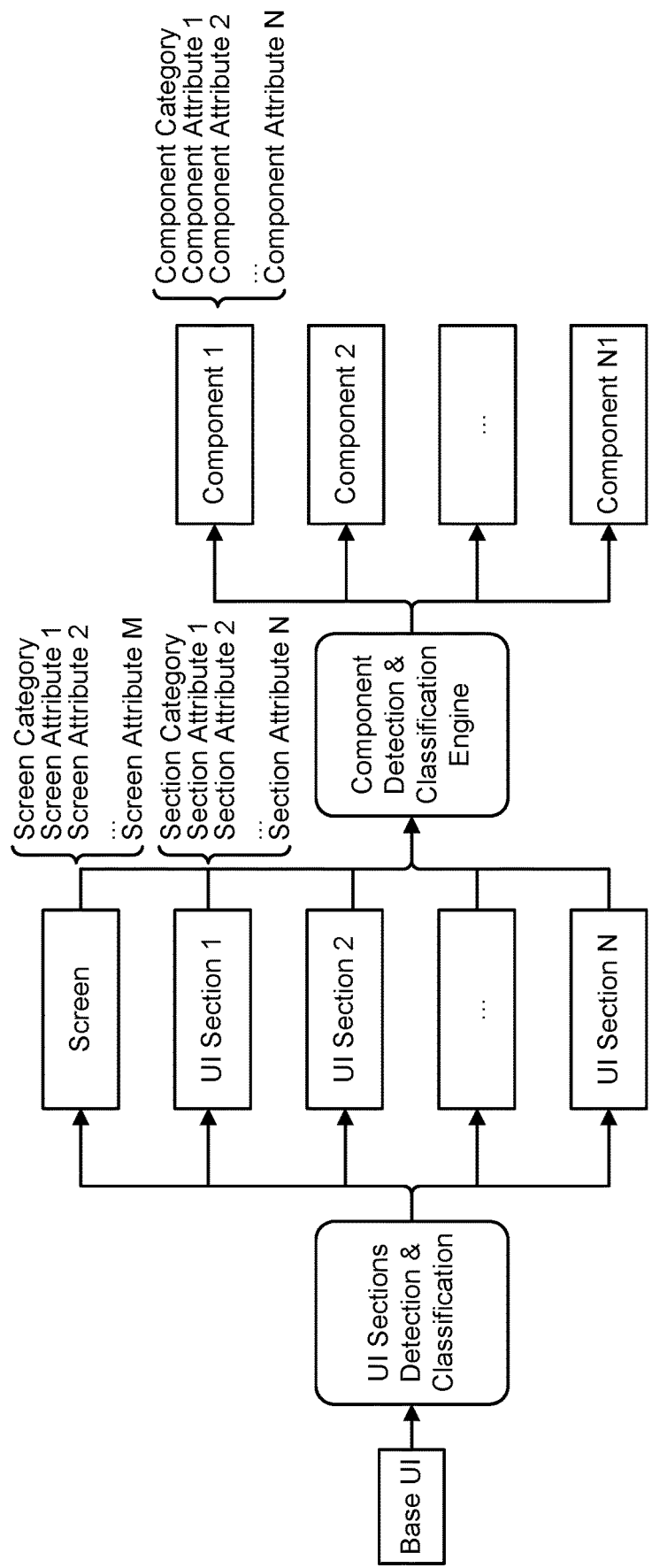
FIG. 4 is a flowchart of the classification process.

Referring to FIG. 4, the system initiates the assessments by analyzing the screen. First, an algorithm is applied to decompose the screen into main sections and extracts the attributes for the main screen and each section. A section is a group of elements that perform a function such as a buy section and an image view section. Each section is then decomposed into its components, the components are classified according to types and attributes and their features are extracted.

Figure 5B:
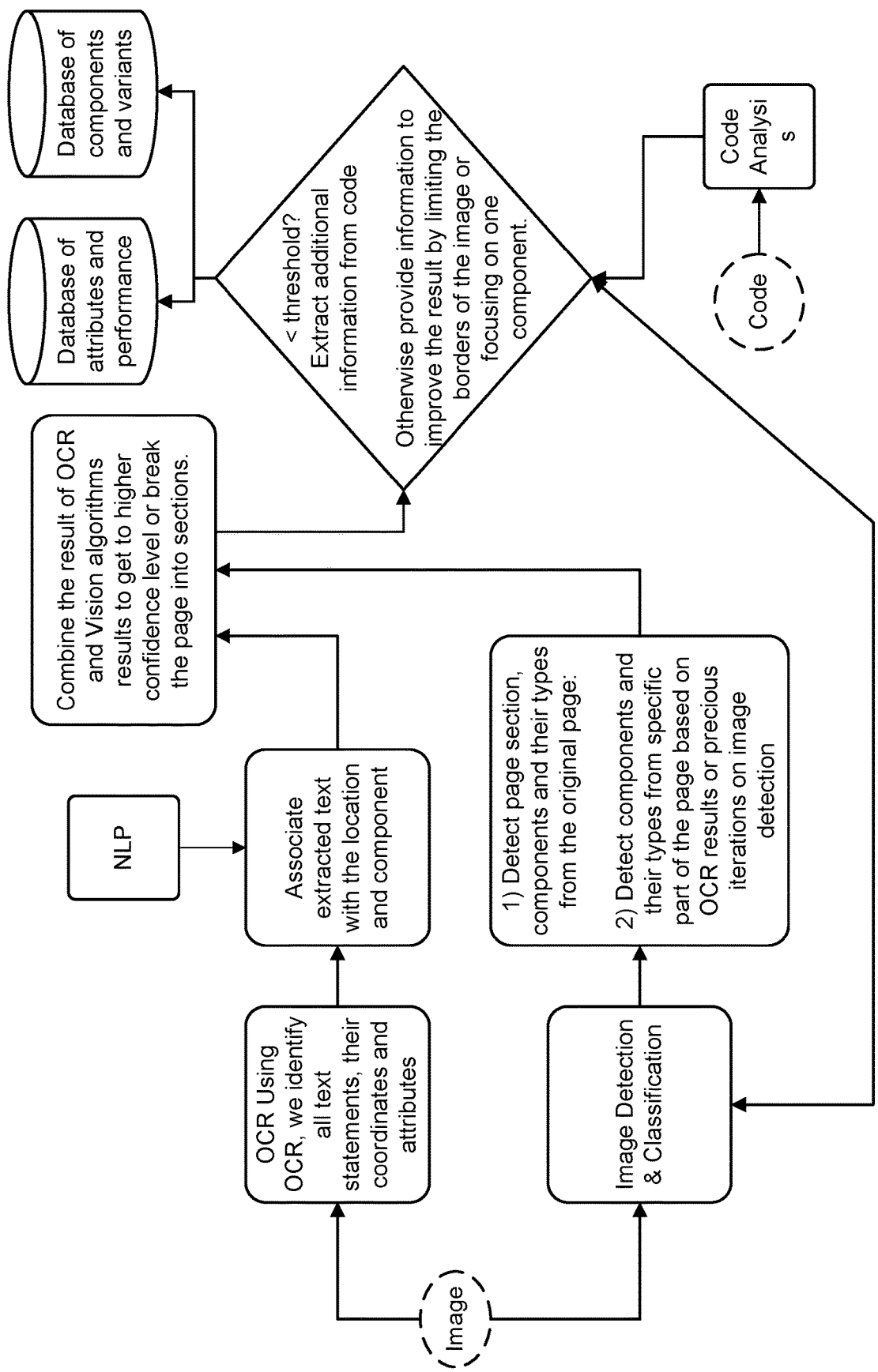

Thus, the detection algorithm uses the input to identify the screen page, and then the page sections. For example, given a product page for an ecommerce website, as shown in FIGS. 5A-A to 5A-C and 5B, the system identifies the page attributes (such as the presence/absence of components as well as which components have more/less emphasis), page sections (such as a buy section, a product description section, etc.). This step also identifies the types and attributes of the page and its sections. For example, identification of the type of product view section and its relative size in the UI. The detection and classification engine represents an iterative process using techniques such as OCR and image detection to detect and classify the components. In a first iteration, the OCR and image detection algorithms may be applied separately to identify the page sections and components. This information may then be used to iterate over the image detection algorithm on specific parts of the page (UI). The iterative process is repeated until a desired confidence threshold is reached. For reinforcing the machine learning, human input may be added as a complementary support approach if the desired confidence threshold level is not reached, with any human input incorporated for future use in the algorithms. In an embodiment, image analysis may comprise image detection, image classification, or both.

The OCR and image detection results may be combined in order to increase the confidence level and/or break the page into sections as described above. The underlying code for the UI may be analyzed for further information at this stage if the confidence level is still below the desired threshold. Once the threshold is reached, the result may then be applied to the database of attributes and performance as well as the database of components and variants.

Figure 6:
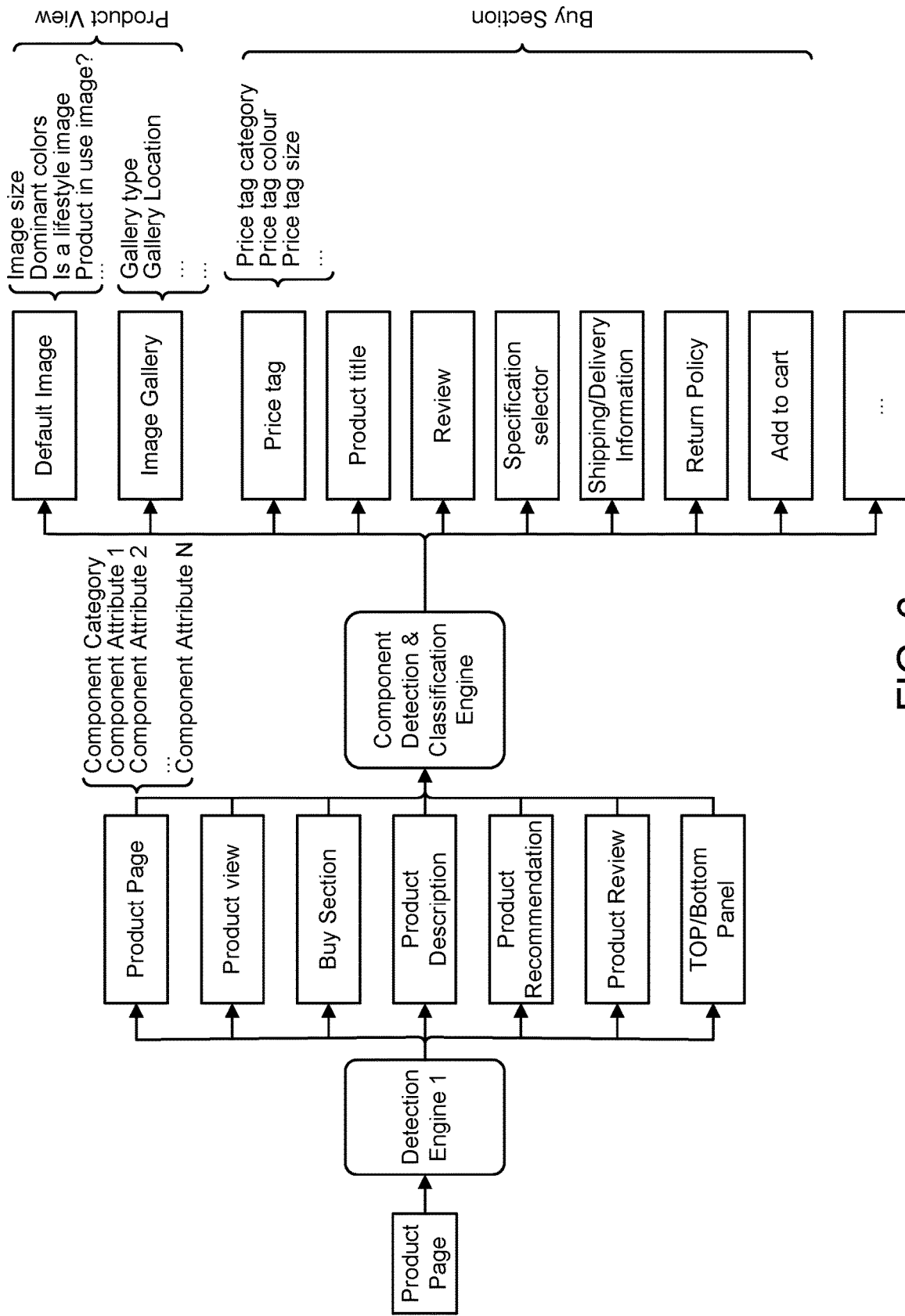
FIG. 6 is a flowchart of the classification process of FIG. 4 as applied to a specific product page.
Figure 12A:
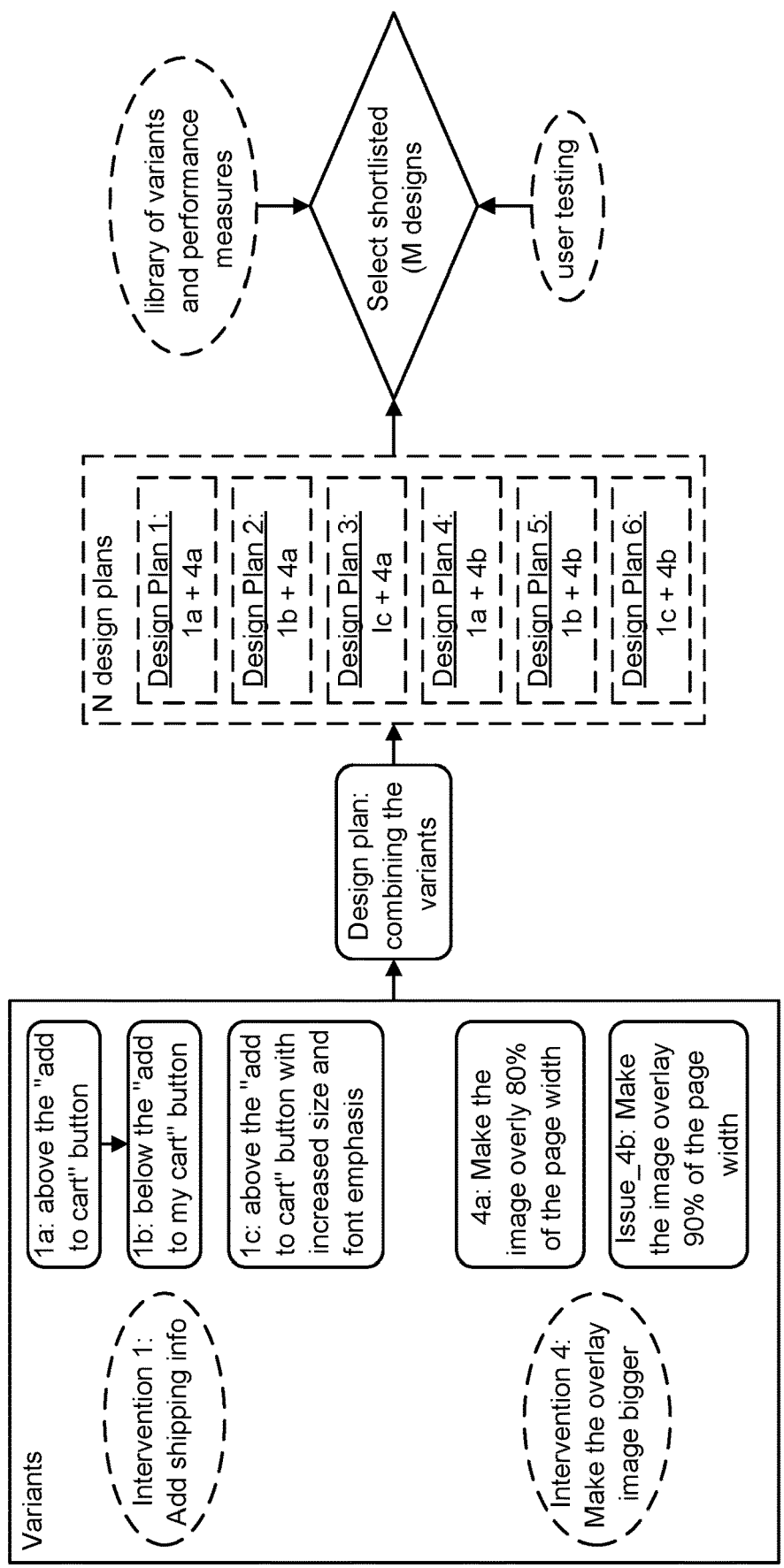

As an illustrative example, consider an assessment for an ecommerce product page as shown in FIG. 6. First, a detection algorithm decomposes the product page to different sections which may include: top panel, product view, buy section, product details, review section, product recommendations, and bottom panel. The algorithm then identifies the components of each section. For example, the following components may be detected in the buy section: product title, price tag, add to cart, review, product type selector, shipping information, delivery information. Once each component is detected, the component is then analyzed to classify the components into types or identify their attributes. For example, types and attributes may include image content, text copy, relative size in the UI and the order of the components such as: price, product title, and shipping information which reflects their emphasis in the UI, and UI overlays. In an embodiment, modifying an attribute for text may include modifying the font, color, size, or the text copy itself. For example, the text description may focus on the style of a product or the functionality of the product resulting in a change in the UI impact score. Referring to FIGS. 12D-A and 12D-B, the text attribute (copy) for the free shipping component describing free shipping uses different copy in the Initial vs Recommended versions. Modifying an attribute for an image may include the size, resolution, or the image content itself. For example, using a lifestyle image vs a product focused image may result in a change in the UI impact score. Modifying an attribute for a recommendations component may include the number of recommendations, the size of the component, and the recommended content itself. Modifying an attribute for a UI overlay may include the size of the overlay, the color of the overlay, and text or image copy in the overlay.

Using the identified attributes for the UI and its components, a UI guideline evaluation is performed by analyzing the UI against a set of UI guidelines. A library of UI guidelines is used which is constructed from a set of standardized UI guidelines developed and gathered from methods including observed usability testing, live user behavior observations and comparative A/B testing, for designing each interface component as well as the overall layout based on collected user experience research data. The UI guideline evaluation then analyzes the guidelines and assigns a pass/fail or a numerical score for each guideline. Any number of guidelines may be analyzed and the resulting output provides a comprehensive understanding of the interface design strengths and weaknesses for the UI.

Figure 7B:
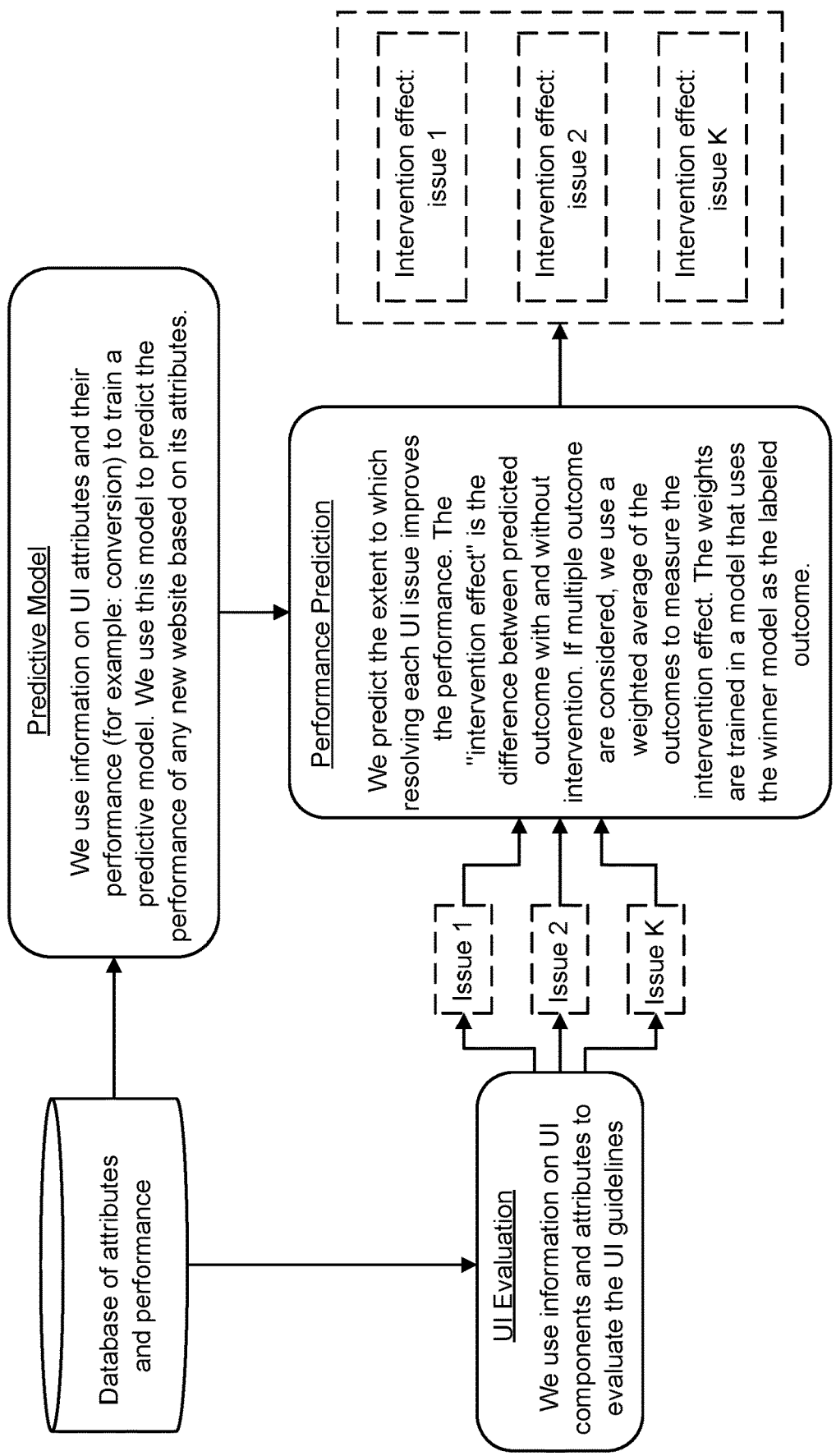
FIG. 7B is a flowchart of the process of FIG. 7A.

Furthermore, performance data is incorporated to measure consequences of noncompliance with guidelines and apply this information to determine whether a modification is necessary and prioritizing the modification procedure for the modification. The results from observed live user behavior and outcomes may be used in the model to increase accuracy of prediction of the impact of future changes as well as to optimize the prioritization of changes. Additionally, for each UI component, tests are performed to ensure the component functionality, data flow, and data recording are valid. For example, a test may be performed to determine whether an "add to cart" button works, usage data generated accordingly, and the data recorded in the database The UI auto-assessment generates a comparative analysis report to compare and rank the UI against other equivalent UIs, such as those for websites and mobile applications. For a given UI type, a library of UIs and their assessment reports is applied to compare UI components and layout against other equivalent UIs. The comparative analysis report generates a detailed comparison by UI guidelines, UI components, features, and layout as well as an overall ranking that takes into account all that information. Examples of the analysis and scoring for an e-commerce webpage are shown in FIGS. 7A and 7B.

As shown in FIG. 7A, four modifications as presented for the e-commerce webpage described above. Each modification is presented with details as to the modifications proposed, along with the predicted performance improvement (as a percentage increase of the overall UI score, although other measures may be used), and the rank for each modification, as determined by the score.

As discussed above, the UI evaluation results in a number of potential issues for modification. The predictive model is applied according to the information from the performance database to predict the performance of the potential modifications. The difference in performance is the "intervention effect" for each potential modification. Depending on the data availability, the system implements two methods to score "intervention effect" on the UI design and performance: multi-aspect scoring and outcome-based scoring as shown in FIG. 7B.

Multi-aspect scoring provides a score for different aspects of the UI functionality, ease of use, responsiveness, accessibility, and compatibility with UI guidelines. Each score is constructed using a weighted average of multiple measures. The weights are selected based on a machine learning model to optimize the interface based on usability data. This data may be captured through a variety of means, for example direct observation and/or online behaviour analytics.

Outcome-based scoring applies a larger volume of data, to score each feature according to its contribution to an outcome. Outcome-based scoring requires that outcomes of the interface are available for analysis. The multi-aspect scoring system is preferred where there is limited data availability on interface performance. With improved data availability on user interface attributes and performance, an outcome-based scoring system may be applied that specifies a score for each component according to their contribution to the outcome of interest. This approach is a statistical model that decomposes an outcome of interest to the contribution of each component/feature. The estimated contribution represents the score of the component in the outcome. In an embodiment, outcome-based scoring is performed on live outcomes generated by users. In another embodiment, outcome-based scoring is performed on outcomes stored in a database. The stored outcomes may come from other user interfaces and not the specific user interface being scored. In a further embodiment, outcome-based scoring is performed on a combination of live outcomes and stored outcomes. As an example, consider a large dataset of website interface data with 5 main features and 3 main features in the product pages and product listing page, respectively. Assuming the objective is to estimate the score of each feature based on an outcome variable, such as conversion or bounce rates, by constructing a causal model of the outcome variable based on the 8 total main features. The estimated parameters of the model measure the contribution of each feature in the outcome variable. This approach may then be extended to different outcome variables such as, for example, revenue, add to cart, checkout, and bounce rates. A feature of this scoring method is in the direct connection to the interface performance. The model built based on this approach may be used to predict the performance of any new website and identify the optimal changes in the interface to drive higher performance.

In an embodiment, both multi-aspect scoring and outcome-based scoring are used to generate the score.

Predicting

The system further comprises a predictive performance engine using a predictive model that uses interface attributes to predict the UI performance. The attributes are captured from the auto-assess functionality of the system and are recorded in a database to be fed into the predictive model. Exemplary performance outcomes for an e-commerce page may include revenue, conversion, add to cart, and checkout. In other scenarios, performance outcomes may include booking a demo, signing up for a subscription, or completing a goal or task.

Figure 8A:
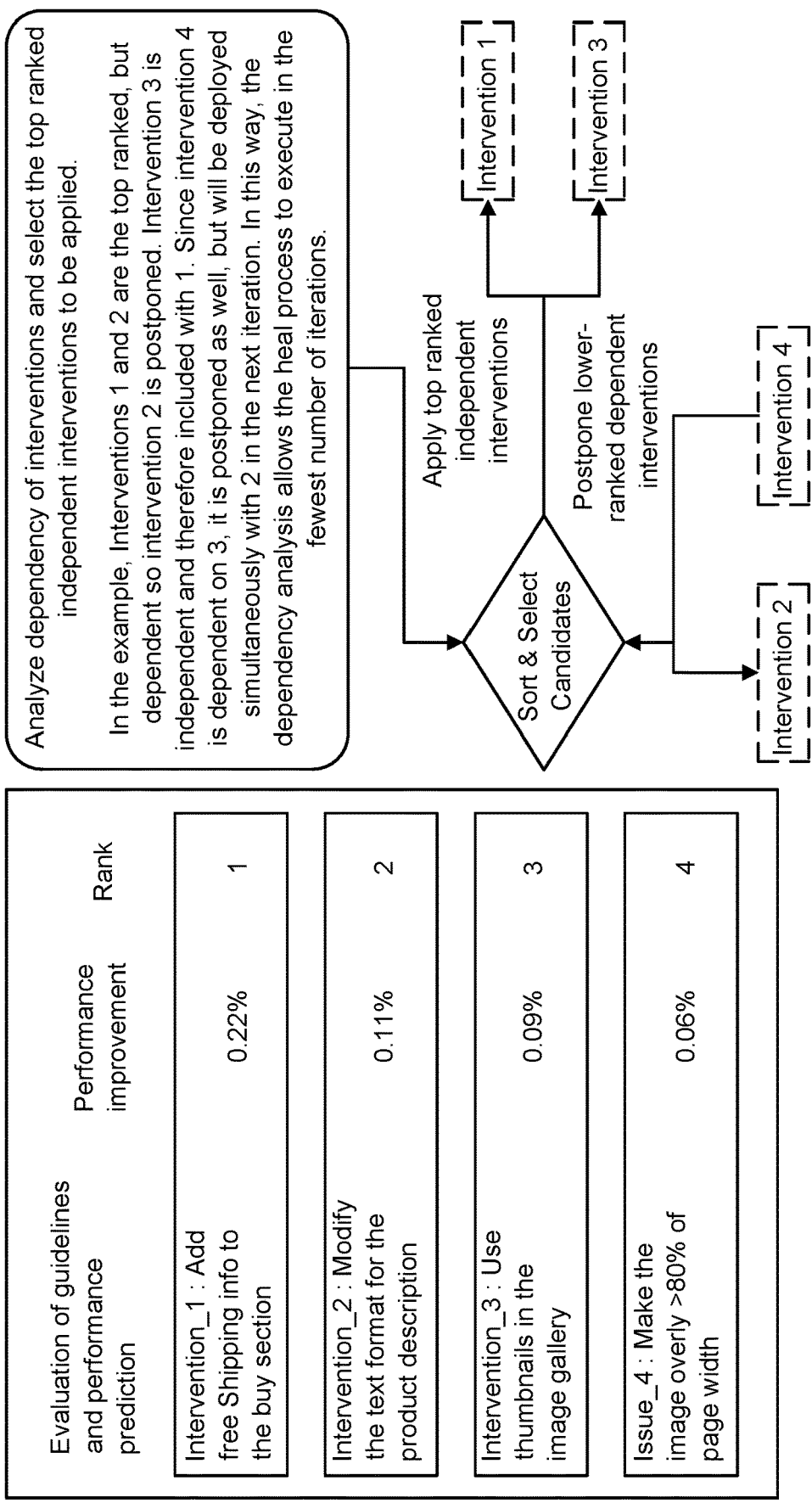
FIGS. 8A and 8B are examples of the predictive process as applied to an ecommerce webpage.

Depending on the model, the performance outcomes may be measured at different levels. For example, the performance outcome could be measured overall for all users, or may be measured for a particular segment of users. Segments may be defined by user attributes that include, for example, demographics (age, gender, etc.), technographics (using a desktop or mobile device, using a certain type of OS or browser, etc.), ad campaign (ad campaign source, ad copy, ad imagery), and behaviours (which screens they have viewed, or in an e-commerce scenario which products or product categories they view). Attributes used may include the presence of specific components in the interface, the type and attribute of the components used in the interface, UI guideline scores, brand and product level attributes and indicators and user level information. Examples of prioritization and dependency for an ecommerce webpage are shown in FIGS. 8A and 8B.

Dependency is defined as how the implementation of an intervention interacts or impacts another intervention. As shown in FIG. 8A, the first and second interventions are also the top two ranked, however, the two interventions are also deemed dependent, and similarly the third and fourth rank interventions are also deemed dependent. Accordingly, the first and third interventions are further determined to both be applicable in a single deployment, while the second and fourth interventions would then be postponed to potentially be applied in a future iteration. Not all identified interventions need to be deployed. For example, only the first and third interventions may be deployed for a decrease in technical risk.

Figure 8B:
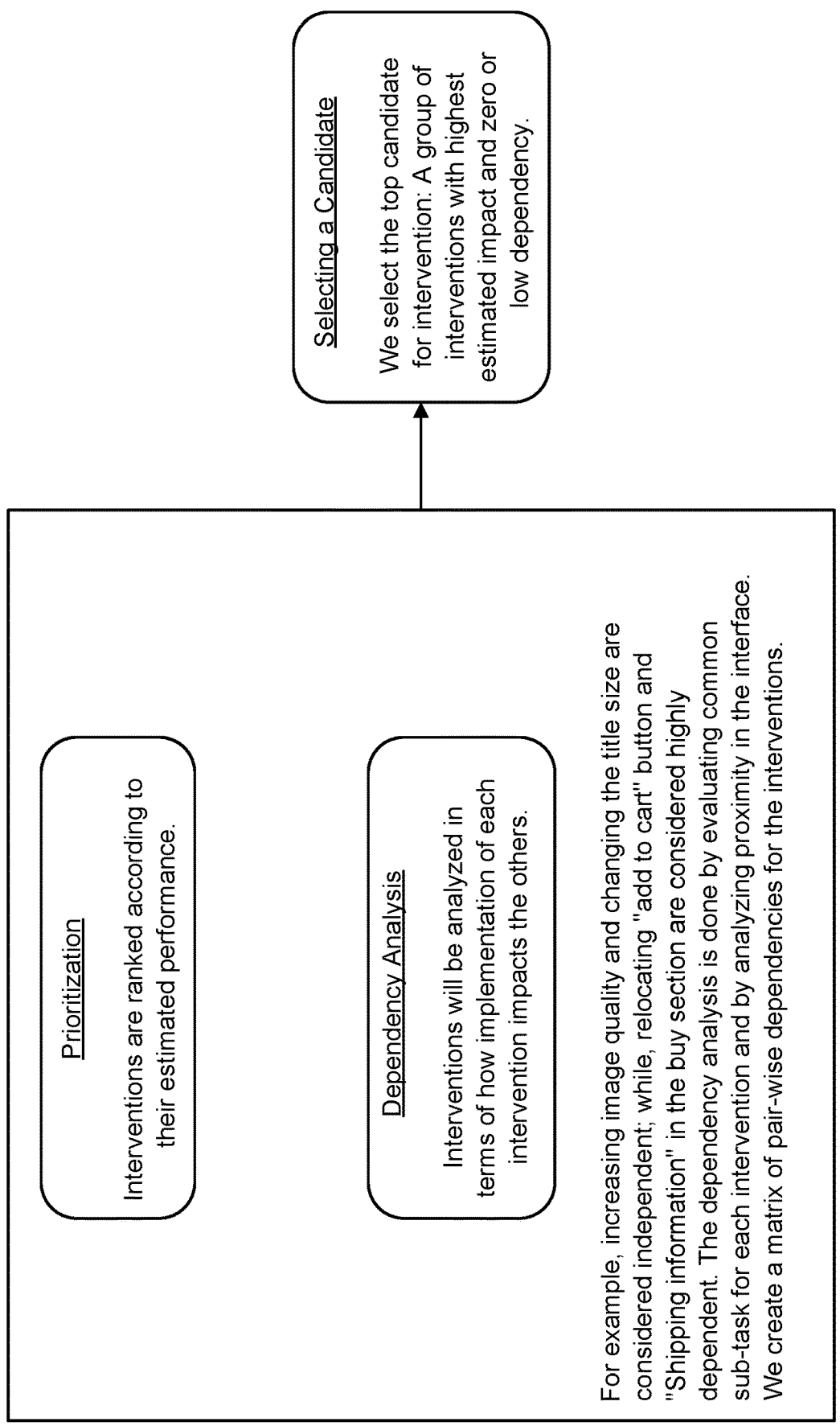

Referring to FIG. 8B, prioritization is the ranking of changes based on estimated performance in changing the scores for the components. Prioritization also leads to dependency analysis of how the implementation of each change impacts the others. As an example, increasing image quality on the page and changing the title size would be considered independent, where each change has little impact on the other. By contrast, relocating an "add to cart" button and "shipping information" button in a "buy" section for a webpage would be considered highly dependent. The dependency analysis is performed by evaluating sub-tasks for each change and analyzing the proximity within the interface. From there, a pair-wise dependency for the changes may be developed. In an embodiment, lowering dependency of the intervention may lower the technical risk when automatically implementing the intervention. An embodiment of the implementation of the intervention is described below in auto-heal. Technical risk may be an unintended consequence or error that is created by the automatic implementation of the intervention.

Predictive models are trained to determine which interface configuration performs best. In some cases, this may result in one interface performing best for all users. In other cases, the model may determine particular segments for which particular interface configurations perform best. These segments relate to the performance outcomes described above.

Additionally, the performance prediction engine has the ability to estimate user intent with respect to outcome. For example, if the outcome is "purchase" the engine can estimate the purchase intent that is the estimate of probability that the user buys a product in that session. The model uses historical session attributes and outcomes, and/or a sequence of behavior captured by screen frames or heatmap frames to train a model for intent estimation. An example of a user intent estimate model is shown in PCT Application No. PCT/CA2020/051773, which is incorporated herein by reference.

Thus, the predictive models for the performance prediction engine are operative to build a simulation algorithm that predicts the performance of any interface for a specific product and user segment and has the ability to predict the performance based on any change in the components. The simulation thus has the ability to prioritize the changes in an interface when facing multiple issues or challenges with the UI.

Healing

Figure 9:
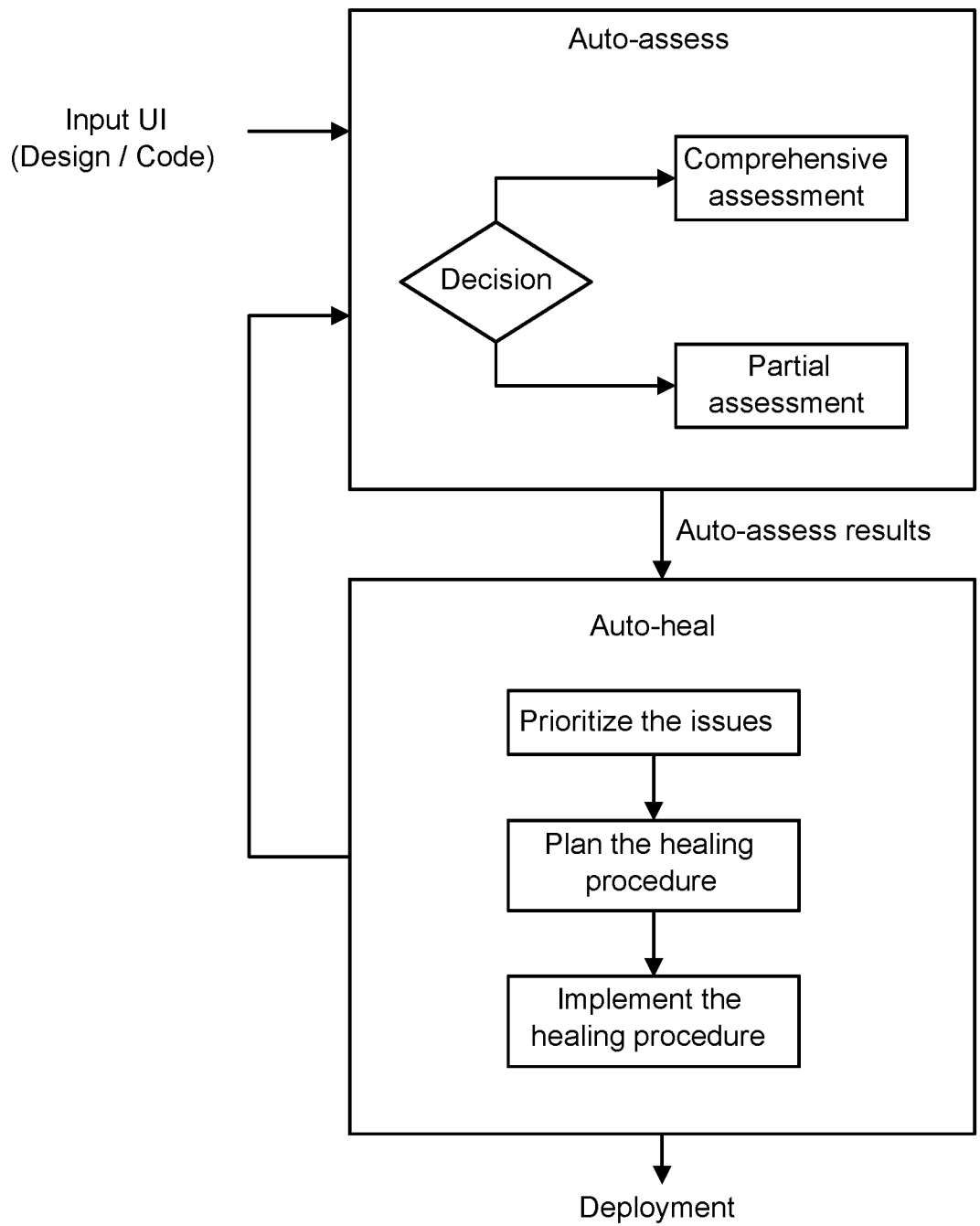
FIG. 9 is a flowchart of the auto-assessment and auto-healing sequencing.

The UI auto healing process is a method for auto-correcting interface design issues identified in the assessment phase. FIG. 9 illustrates a sequential process from auto-assessment to auto-healing.

The auto-heal system and process takes as an input the auto-assessment output combined with the predictive performance engine as discussed above. The auto-heal process analyzes the results of auto-assessments including: UI scores, UI component functionality tests, UI guideline evaluations, and comparative analysis in order to identify the issues requiring modification.

The auto-heal process considers various types of design and performance issues for modification. These issues may include: layout design issues; content issues (words/images/videos); visual design issues (such as optimal font size, and font color); and bugs in component performance (such as buttons not firing or analytics events).

The auto healing system incorporates a combination of following functionalities: identifying the issues (Identify); identifying the main issues or a group of independent issues with the highest priority and generate plans for the modifications (Plan); and an AI-based auto healing procedure to implement the modifications (Implement) as illustrated in FIG. 9.

The design modification process implements the healing plan and automatically generates multiple design candidates. The prediction engine discussed above may then be used to provide estimates of performance and this information is considered in selecting among the multiple design candidates. In an embodiment, a dashboard or user interface is used to present the design candidates, collect feedback from designers and implement user testing on mock designs. The data presented through this dashboard is used to select a variable number (N) of top designs. The auto-heal process then applies a multivariate testing engine that takes the N top designs as input, generates the code for the designs using a UI to code engine, deploys the code and selects the top design based on performance. If it is determined that different user segments responded differently to the variants, the winner is applied appropriately for each user segment. In an embodiment, generating one or more potential modifications to one or more discrete components based on the user segment from a database of potential modifications. In an embodiment, the dashboard or user interface is provided by the presentation component.

The first step (IDENTIFY) is to identify the issues using the results from the UI auto-assessment process. For each UI page the system performs the following process:

As discussed above, the auto-assessment system assesses the UI page against guidelines, technical performance, and business outcomes. The UI page status will be summarized as a score using the scoring system. The auto-assessment algorithms may be further upgraded by machine learning and human feedback from the output results. The human feedback for the output results is used to establish further ground truth for the machine learning.

Figure 10A:
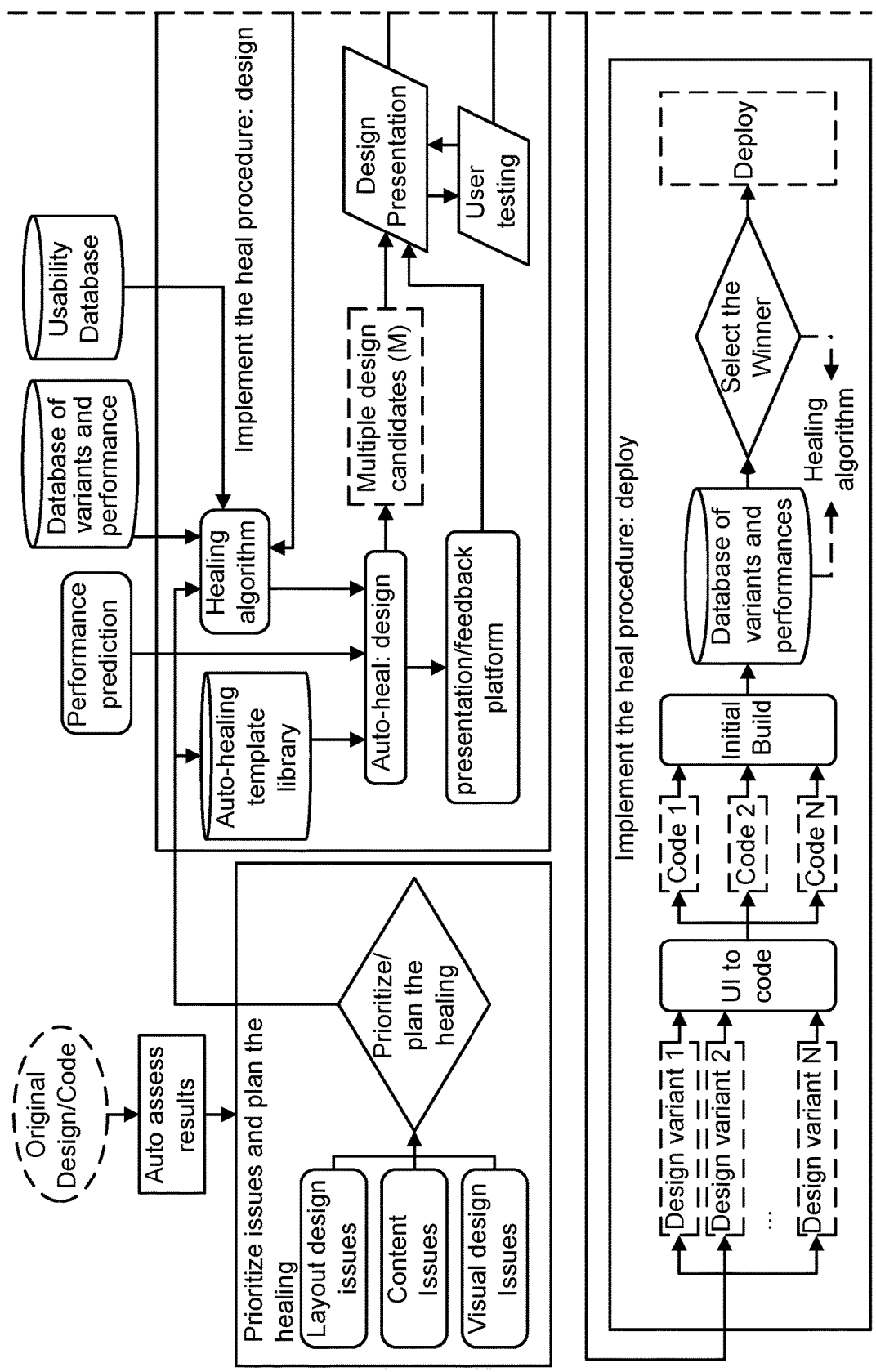
FIGS. 10A and 10B are a flowchart of the auto-healing and testing process.
Figure 10B:
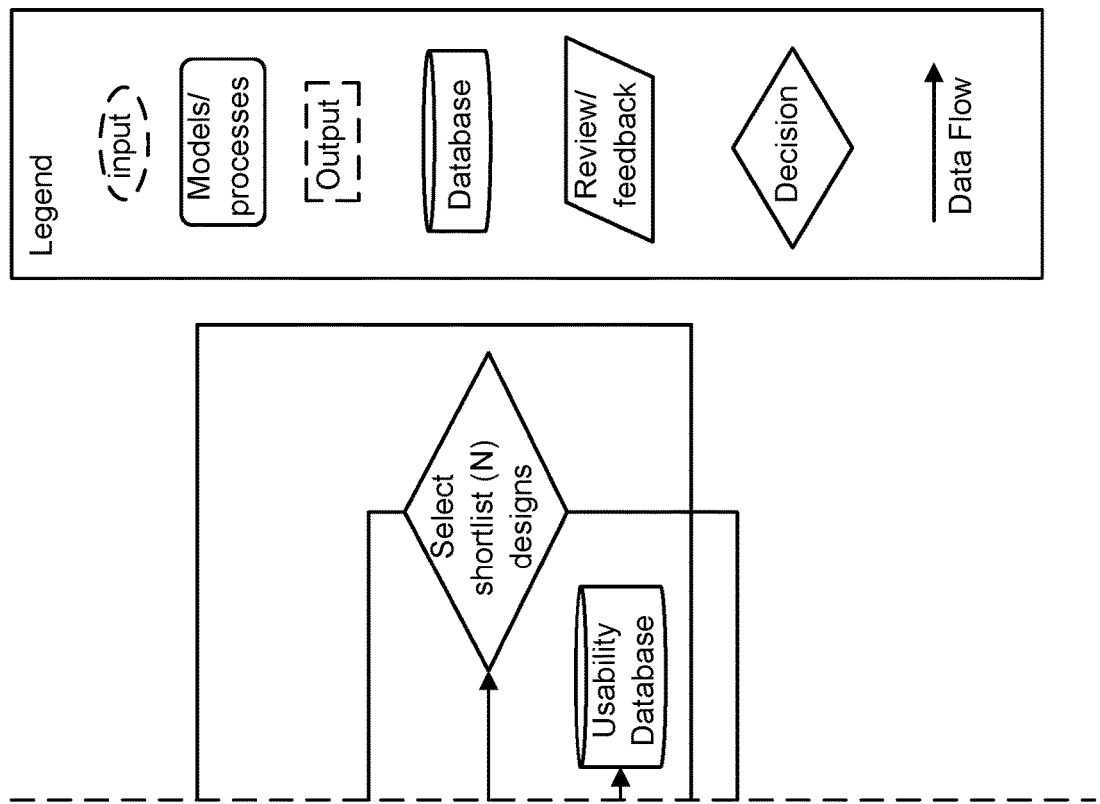

Auto-heal planning (PLAN) is illustrated in the left panel of FIGS. 10A and 10B. The auto-heal plan process analyzes the design issues (layout, content, and visual design) to prioritize and plan the healing process by identifying the best candidate for modification. The candidate is then the top performing modification or combination of modifications that perform better than any single modification if such a combination exists. The performance of a modification is measured by expected change in the score as a result of implementation of the modification. The planning process selects the candidate for modification as follows:

The system considers the possible fixes and improvements to the current state of the UI page and estimates the expected score after each distinct modification. Modifications include fixes to guideline failures, fixes and improvements in technical performance and business outcomes. The system then selects the most effective modification based on the estimated score change as the best candidate for modification.

In cases where multiple modifications do not contravene each other, the system may select the combination of modifications as the best candidate for modification. In this case the combination of modifications is expected to score higher than any single intervention. Modifications or interventions contravene each other when it is not possible to implement the modifications on or for the same UI page. In another embodiment the modifications may be possible to implement at the same time or on or for the same UI page but there are other incompatibilities or undesirable technical outcomes.

Figure 11:
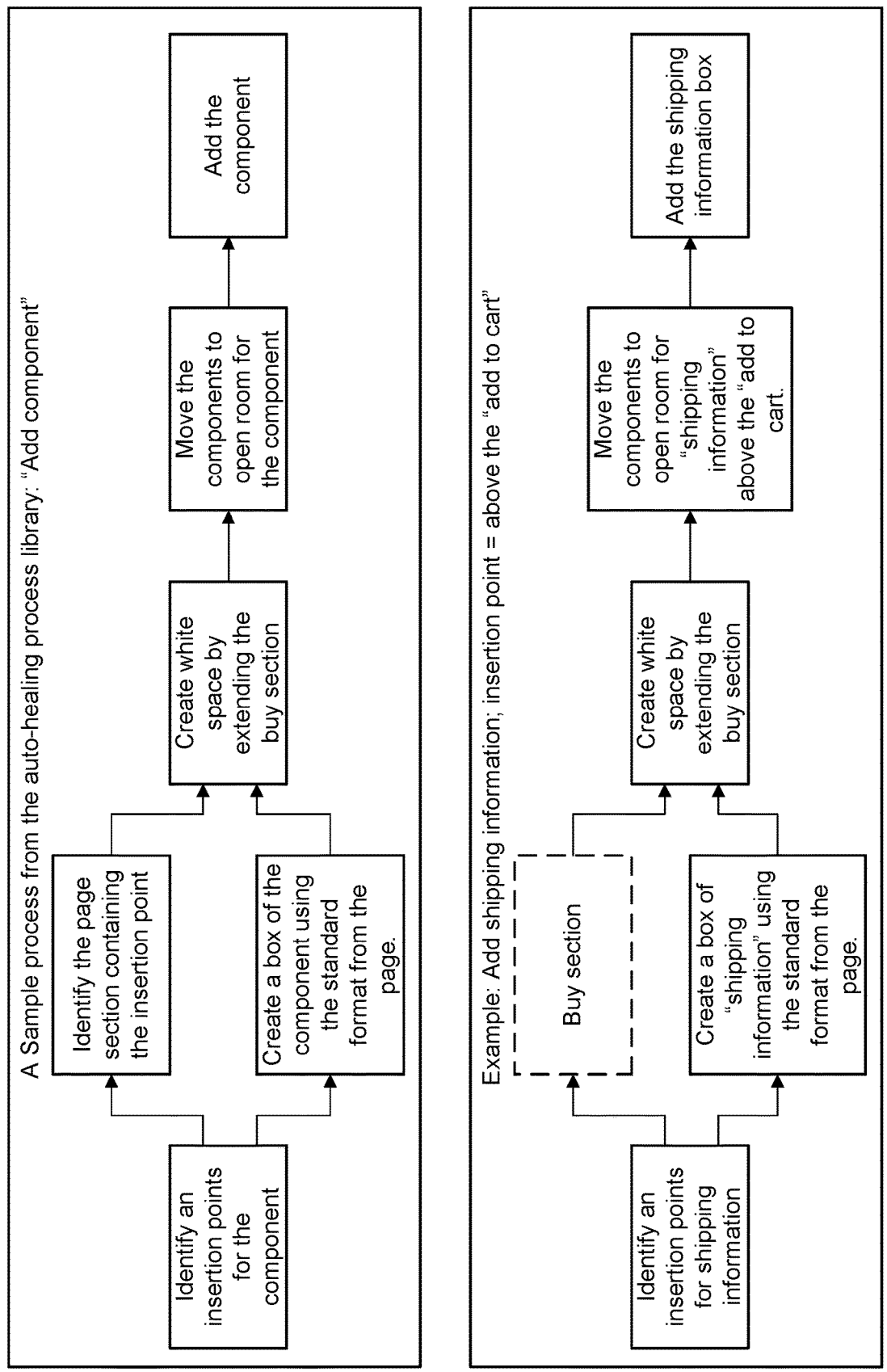
FIG. 11 is a flowchart of the auto-healing process using a component library, and example.

Once the candidate for modification is selected, a planning algorithm generates the design modification process by using a library of modifications as shown in FIG. 11. For the "add component" process, the insertion point for the component is identified. The page section containing the insertion point is identified, and the component is created according to the format of the page. White space may be created by extending a section and/or moving other components to create space. The component is then added. A specific process for adding shipping information above the "add to cart" button on a ecommerce webpage is also shown as an illustrative example.

The library of modifications contains the possible components and their types in order to generate potential modifications.

The library of modifications may include processes such as:

Modifying text style: changing size, font, color, and/or representation in the UI page (e.g. representing price with a larger font and different color).

Modifying text content: Changing the content of a product description, or of a description in the buy section of the UI page.

Modifying images: changing the image size, and/or resolution.

Generating an information request prompt to the site host or site designer: requesting information to add or modify the website content with content that does not current exist such as delivery scheduling, additional images or additional text.

Adding features e.g. adding a gift indicator checkbox.

Information architecture: category of products, filter design, structure of other hierarchical content.

Changing the component style: e.g. "add to cart" style and size, background color, borders.

Changing number of items in a list: e.g. number of product cards, number of reviews.

Technical functionality fixes: e.g. speed, unresponsive buttons.

Detecting and adding or removing whitespace in a page.

Adding a component: if the component or functionality does not exist, it generates a prompt for the website owner to provide suitable elements e.g. adding a "Free shipping condition" text box in the buy section.

Moving a component: e.g. changing the location of a component on a page.

Removing a component, e.g. removing a detailed product description from the buy section.

Overall redesign via modifying the layout or multiple components. When multiple modifications are prescribed by the auto-assessment system, the redesign process proceeds by prioritizing the components in the design, generating a template and rebuilding the design. For example, consider a case where the buy section both provides excessive product description details but omits essential information such as "free shipping conditions" and "product review". In this case, the buy section is decomposed into its components and their respective locations, suitable content is identified along with an optimal location for a brief description, shipping information, and product review statistics. Then the process for implementing the new design is initiated.

Correcting the functionality, e.g. when a non-functioning component is detected, a modification process is initiated in this section to resolve the bug.

The library of modifications may be updated automatically based on new input, or from external sources. In an embodiment, automated addition of modifications may also be done manually or require approval by a designer, either for all cases, or a limited set of cases by presenting the modifications to be added through the presentation component. Additions may arise from different sources, such as UI changes previously implemented by the system, or by monitoring existing websites for changes and modifications.

Figure 12C:
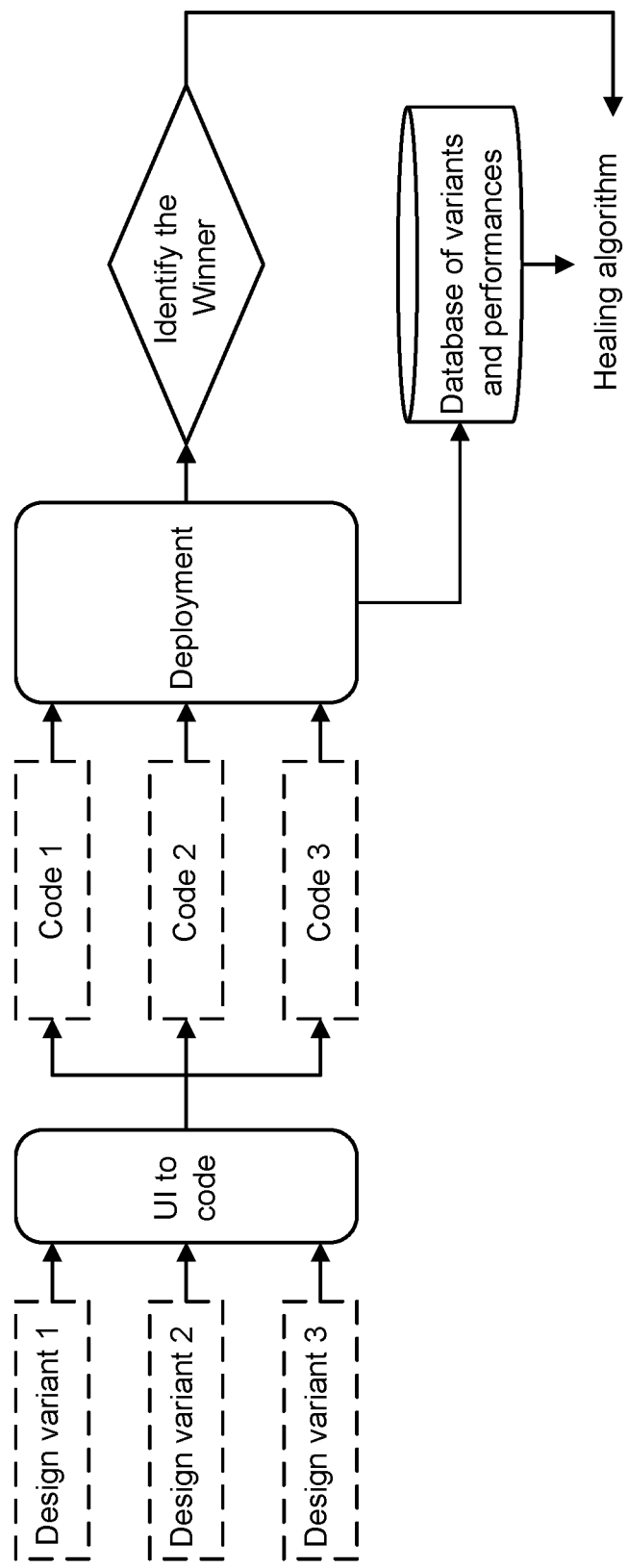

In another example, considering all of the above, referring to FIGS. 12A, 12B-A, 12B-B, and 12C, the modification process using the first and fourth interventions (as initially described in FIG. 8A) is shown. As shown in FIG. 12A, from the ecommerce example above, three variants of the first intervention and two variants of the fourth intervention are created. The design plan then creates six design plans (from the combinations of the variants) which are then shortlisted according to the process described above. A more general version of the process is shown in FIGS. 12B-A and 12B-B.

Referring to FIG. 12C, the shortlisted variants are then converted to code for deployment in a testing environment. From this testing environment, a modification is selected (a "winner") and, as the code is already created, the selected modification may be now implemented.

As shown in FIGS. 12D-A and 12D-B, by leveraging the model created from the auto-assessment, the system may create a mockup to visually modify the interface to apply a template to match the style of the target interface based on the selected modification. In the present example, the template copy and optimal location for "free shipping" is integrated into an appropriate area of the "buy" section of the UI. The template selection is generally non-trivial as many modifications are possible and many would not be visually suitable. By applying the training method for the auto-heal algorithm the system is able to analyze and understand the target interface and apply the template in a visually consistent and suitable manner.

The auto-generated mockups may be used to verify the effectiveness of the auto-generated design update (from the template) prior to deployment. Feedback from this evaluation may be fed directly into the auto-heal algorithm for training and application. Or, may be first reviewed with human intervention to confirm and edit the results, and then fed back in to the algorithm.

Accordingly, the system applies both usability testing as well as real user data to train the model for selecting the optimal design. The system keeps track of all the changes in design and outcomes from usability testing and real user data to update the models periodically.

Thus, the healing algorithm uses the available information from previous testing external sources (e.g. best practices), usability testing, and designer feedback to train the healing model and provide input to the auto-heal design process for future implementations.

The following clauses are offered as further description of the examples of the method and system. Any one or more of the following clauses may be combinable with any other one or more of the clauses, combinations of clauses, and/or permutations of clauses. Any one of the following clauses may stand on its own merit without having to be combined with any other clause or with any other portion of any other clause. Clause 1: A method for automatic modification of a user interface (UI), comprising: a) decomposing the UI into discrete components via application of a combination of decomposition methods, the decomposition methods comprising one or more of: Optical Character Recognition (OCR), Image analysis, and source code analysis, with each discrete component further assigned one or more attributes; b) analyzing the discrete components of the UI via a predictive performance engine to produce an evaluation, the evaluation generating a list of performance parameters per segment, the segments based on one or more of: user, category, product and brand, associated with one or more of the discrete components; c) generating a quantitative evaluation value impact based on the performance parameters for each discrete component, identifying which discrete components generate a value impact and ranking the identified components based on the magnitude of the value impact; d) selecting one or more modifications (add/replace/delete) to the identified components via iterative application of the predictive performance engine to one or more potential modifications to the attributes of the identified components via modification of one or more attributes of the identified components such that the selected modification produces an improvement to the quantitative evaluation value impact for the identified component; and e) generating a modified UI, the modified UI containing one or more of the modified components. Clause 2: The method for automatic modification of a user interface (UI), wherein the analysis and evaluation further comprises prediction of user behaviour of sequential steps of user interactions with the UI based on a database of historic user interactions with the UI and other equivalent UIs. Clause 3: The method for automatic modification of a user interface (UI), wherein the evaluation of modified UI is performed using a combination of quantitative and qualitative analysis. Clause 4: The method for automatic modification of a user interface (UI), wherein the generation of the modified UI comprises applying code changes for the modified components into UI code. Clause 5: The method for automatic modification of a user interface (UI), wherein the performance parameters comprise one or more of: layout, content, showing/hiding components and display resolution. Clause 6: The method for automatic modification of a user interface (UI), wherein the evaluation further comprises an assessment of dependencies between the discrete components. Clause 7: The method for automatic modification of a user interface (UI), wherein the number of replacement components in the modified UI is no more than three. Clause 8: The method for automatic modification of a user interface (UI), wherein the attributes comprise one or more of: font color, font size, image size, image resolution, display position, and interactivity. Clause 9: A system for automatic modification of a user interface (UI), comprising, a memory, a processor, and wherein the processor is configured to performs the steps of any clause 1 to 8, any combination of clauses 1 to 8, and/or any portion of any clause 1 to 8.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A method for automatic modification of a graphical user interface (GUI), comprising:
   decomposing a user interface (UI) into discrete components, by applying a component classification engine to the UI, the classification engine applying a combination of decomposition methods;
   identifying one or more attributes for each discrete component;
   evaluating each discrete component of the UI by applying an evaluation engine to produce a quantitative evaluation of UI impact for each discrete component based on a comparison with historical UI data from a historical UI database;
   generating one or more potential modifications to one or more discrete components from a database of potential modifications;
   scoring the UI impact according to a predicted change in the UI impact of the one or more potential modifications based on the historical UI data to generate a rank for each potential modification based on a predicted outcome of the potential modification, wherein the scoring further comprises:
  identifying a dependence of a second discrete component of the discrete components on a first discrete component of the discrete components, wherein the first discrete component and the second discrete component are associated with a a given task executable through the UI, such that the first discrete component is associated with a first sub-task of the given task, and the second discrete component is associated with a second sub-task of the given task, and the first sub-task and the second sub-task are executed to complete the given task, wherein the first discrete component has a higher rank than the second discrete component, and the second discrete component has a higher rank than a third discrete component of the discrete components;
  prioritizing the one or more potential modifications to provide prioritized potential modifications based on the rank and the identified dependence for a best predicted outcome, wherein the second discrete component is assigned a lower priority than the first discrete component and the third discrete component; and
  modifying the UI based on at least one of the prioritized potential modifications.

2. The method of claim 1, further comprising the steps of:
  selecting at least two of the prioritized potential modifications for testing;
  generating at least two potential modified UIs for testing from the selected prioritized potential modifications, wherein one of the at least two potential modified UIs comprises the first discrete component and the third discrete component and excludes the second discrete component; and
  applying multivariate testing to the at least two potential modified UIs to identify a final modified UI design.

3. The method of claim 1, wherein the scoring further comprises analysis of dependencies between the second discrete component and the first discrete component.

4. The method of claim 3, wherein the best predicted outcome further comprises a combination of maximizing positive quantitative impact, maximizing confidence of impact, and minimizing dependencies.

5. The method of claim 1, wherein the one or more potential modifications are selected from one of more of: adding a component, deleting a component, moving a component and modifying an attribute of a component.

6. The method of claim 1, wherein the evaluation and scoring further comprise prediction of user intent of sequential steps of user interactions with the UI based on a database of historic user interactions with the UI and other equivalent UIs.

7. The method of claim 2, wherein at least one of the one or more potential modified UIs comprise multiple instances of the one or more potential modifications.

8. The method of claim 1, further comprises presenting the prioritized potential modifications and associated quantitative value impacts to a user for selection.

9. The method of claim 8, wherein user selection inputs are added to the historical UI data in the historical UI database, and/or the database of potential modifications.

10. The method of claim 1, wherein the potential modifications are selected from a database of components and modified components.

11. A system for automatic modification of a graphical user interface (GUI), comprising:
  a component classification engine operative to decompose a user interface (UI) into discrete components, the classification engine applying a combination of decomposition methods;
  the component classification engine operative to identify one or more attributes for each discrete component;
  an evaluation engine operative to evaluate each discrete component of the UI to produce a quantitative evaluation of UI impact for each discrete component based on a comparison with historical UI data from a historical UI database;
  the evaluation engine operation to generate one or more potential modifications to one or more discrete components from a database of potential modifications;
  a UI scoring component operative to score the UI impact according to a predicted change in UI impact of the one or more potential modifications based on the historical UI data to generate a rank for each potential modification based on a predicted outcome of the potential modification, wherein the scoring comprises:
    identifying a dependence of a second discrete component of the discrete components on a first discrete component of the discrete components, wherein the first discrete component and the second discrete component are associated with a given task executable through the UI, such that the first discrete component is associated with a first sub-task of the given task, and the second discrete component is associated with a second sub-task of the given task, and the first sub-task and the second sub-task are executed to complete the given task, wherein the first discrete component has a higher rank than the second discrete component, and the second discrete component has a higher rank than a third discrete component of the discrete components;
  an planning component operative to prioritize the one or more potential modifications to provide prioritized potential modifications based on the rank and the identified dependence for a best predicted outcome, wherein the second discrete component is assigned a lower priority than the first discrete component and the third discrete component; and
  the implementation component operative to modify the UI based on at least one of the prioritized potential modifications.

12. The system of claim 11, further comprising a presentation component operative to present the prioritized potential modifications and their associated quantitative value impacts to a user for selection.

13. The system of claim 12, further comprising adding user selection inputs to the historical UI data in the historical UI database, and/or the database of potential modifications.

14. The system of claim 11, wherein the implementation component is further operative to:
  select at least two of the prioritized potential modifications for testing;
  generate at least two potential modified UIs for testing from the selected prioritized potential modifications, wherein one of the at least two potential modified UIs comprises the first discrete component and the third discrete component and excludes the second discrete component; and
  apply multivariate testing to the at least two potential modified UIs to identify a final modified UI design.

15. The system of claim 11, wherein the UI scoring component is further operative to analyze dependencies between the second discrete component and the first discrete component.

16. The system of claim 15, wherein the planning component is further operative to generate the best predicted outcome based on a combination of maximizing positive quantitative impact, maximizing confidence of impact and minimizing dependencies.

17. The system of claim 11, wherein the evaluation engine is further operative to select a subset of the one or more potential modifications from one of more of: adding a component, deleting a component, moving a component and modifying an attribute of a component.

18. The system of claim 11, wherein the UI scoring component is further operative to apply prediction of user intent of sequential steps of user interactions with the UI based on a database of historic user interactions with the UI and other equivalent UIs.

19. The system of claim 14, wherein at least one of the one or more potential modified UIs comprise multiple potential modifications.

20. The system of claim 11, wherein the one or more potential modifications are selected from a database of components and modified components.

* * * * *

UNITED STATES PATENT AND TRADEMARK OFFICE
CERTIFICATE OF CORRECTION

| | |
|---|---|
| PATENT NO. | : 12,061,883 B2 |
| APPLICATION NO. | : 17/893375 |
| DATED | : August 13, 2024 |
| INVENTOR(S) | : Ebrahim Azimi et al. |

It is certified that error appears in the above-identified patent and that said Letters Patent is hereby corrected as shown below:

On the Title Page

Item (72) Please add inventor: Noor Syed, Mississauga (CA)

Signed and Sealed this
Twenty-fifth Day of February, 2025

Coke Morgan Stewart
*Acting Director of the United States Patent and Trademark Office*